(12) United States Patent
Miyawaki et al.

(10) Patent No.: US 9,626,952 B2
(45) Date of Patent: Apr. 18, 2017

(54) EMULSION COMPOSITION FOR VIBRATION DAMPING MATERIALS

(71) Applicant: NIPPON SHOKUBAI CO., LTD., Osaka-shi, Osaka (JP)

(72) Inventors: Yukihiro Miyawaki, Osaka (JP); Masaya Uchida, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 14/767,221

(22) PCT Filed: Feb. 14, 2014

(86) PCT No.: PCT/JP2014/053515
§ 371 (c)(1),
(2) Date: Aug. 11, 2015

(87) PCT Pub. No.: WO2014/126212
PCT Pub. Date: Aug. 21, 2014

(65) Prior Publication Data
US 2016/0035340 A1    Feb. 4, 2016

(30) Foreign Application Priority Data

| Feb. 15, 2013 | (JP) | ................... | 2013-028109 |
| Feb. 15, 2013 | (JP) | ................... | 2013-028110 |
| Aug. 26, 2013 | (JP) | ................... | 2013-174764 |
| Aug. 26, 2013 | (JP) | ................... | 2013-174765 |
| Feb. 14, 2014 | (JP) | ................... | 2014-026703 |

(51) Int. Cl.
*G10K 11/16* (2006.01)
*C08L 33/12* (2006.01)
*C08L 25/14* (2006.01)
*G10K 11/162* (2006.01)

(52) U.S. Cl.
CPC .......... *G10K 11/162* (2013.01); *C08L 25/14* (2013.01); *C08L 33/12* (2013.01)

(58) Field of Classification Search
CPC ........ G10K 11/162; C08L 33/12; C08L 25/14
USPC .......................................................... 524/556
See application file for complete search history.

(56) References Cited

U.S. PATENT DOCUMENTS

| 2004/0211934 | A1* | 10/2004 | LeStarge ............. | G10K 11/165 252/62 |
| 2010/0160495 | A1* | 6/2010 | Teramoto .............. | C09D 5/02 523/400 |

FOREIGN PATENT DOCUMENTS

| JP | 2003-042223 | | 2/2003 |
| JP | 2003042223 A | * | 2/2003 |
| JP | 2005-126644 | | 5/2005 |
| JP | 2005126644 A | * | 5/2005 |
| JP | 2006-526689 | | 11/2006 |
| JP | 2006526689 A | * | 11/2006 |
| JP | 2008-291077 | | 12/2008 |
| JP | 2008291077 A | * | 12/2008 |
| JP | 2012-126774 | | 7/2012 |
| JP | 2012126774 A | * | 7/2012 |
| WO | 2004/098230 | | 11/2004 |

OTHER PUBLICATIONS

International Search Report issued in International Application No. PCT/JP2014/053515, May 20, 2014, 4 pages.

* cited by examiner

*Primary Examiner* — Michael M Bernshteyn
(74) *Attorney, Agent, or Firm* — Hamre, Schumann, Mueller & Larson, P.C.

(57) ABSTRACT

The present invention aims to provide a composition for vibration damping materials which provides excellent vibration damping property. The present invention relates to an emulsion composition for vibration damping materials including: a vibration damping modifier including a compound that has 7 or more carbon atoms, a boiling point of 190° C. or higher, and at least two ether groups or at least two ester groups in the molecule; and a polymer emulsion.

9 Claims, 1 Drawing Sheet

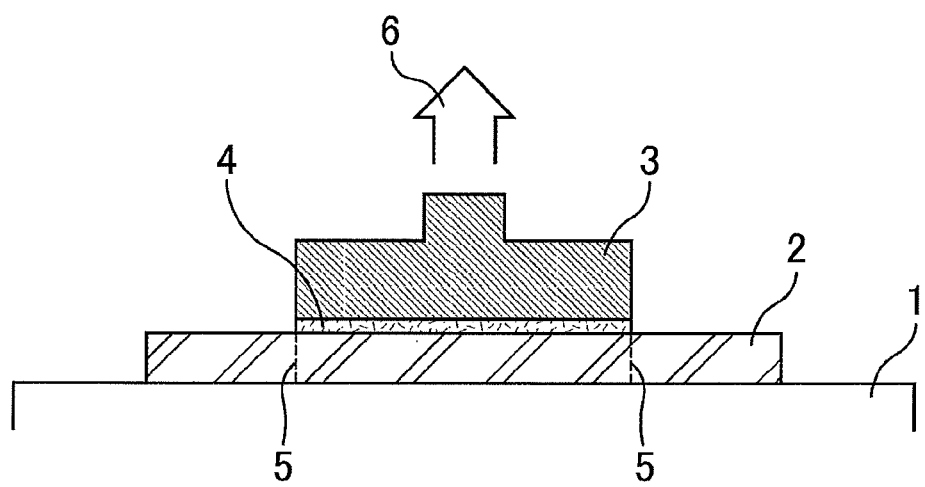

EMULSION COMPOSITION FOR VIBRATION DAMPING MATERIALS

TECHNICAL FIELD

The present invention relates to an emulsion composition for vibration damping materials. Specifically, the present invention relates to an emulsion composition for vibration damping materials used to prevent vibration or noise of various structures, thereby to insure sustained quietude.

BACKGROUND ART

Vibration damping materials are used to prevent vibration or noise of various structures to insure sustained quietude. The vibration damping materials have been widely used for, for example, underfloor spaces of automobile interior, or for railway vehicles, ships, aircrafts, electric devices, buildings, or construction machinery. Such vibration damping materials have been conventionally made from materials having vibration absorbing performance or sound absorbing performance, and molded products such as plate products or sheet products have been used as vibration damping materials. Such molded products are however difficult to use at vibration- or noise-generation positions having complicated shapes. Therefore, various methods for improving the workability and maintaining sufficient vibration damping property have been examined. For example, an inorganic powder-containing asphalt sheet has been used for underfloor spaces of automobile interior. However, since the sheet must be bonded by thermal fusion, the workability and the like need to be improved. Therefore, studies have been made on various compositions or polymers for forming vibration damping materials.

Application type vibration damping materials (coating materials) have been developed as an alternative to such molded products. For example, vibration damping coating materials have been suggested which can absorb vibration or sound in the form of a coating formed by spraying a vibration damping coating material onto or applying a vibration damping coating material to target areas by an optional method. Specifically, aqueous vibration damping coating materials with improved coating hardness have been developed, which are obtained by blending a vehicle such as asphalt, rubber, or synthetic resin with synthetic resin powders. In addition, for interior parts of automobiles, vibration damping coating materials have been developed, which are prepared by dispersing activated carbon as a filler into a resin emulsion. However, these conventional items still do not reach the sufficient level of vibration damping performance. Therefore, a technique for achieving sufficient vibration damping performance has been required.

As conventional compositions or the like used for vibration damping materials, for example, Patent Literature 1 discloses a copolymer emulsion for vibration damping materials prepared by copolymerizing a monomer mixture essentially including an acrylic monomer.

CITATION LIST

Patent Literature

Patent Literature 1: JP 2003-42223 A

SUMMARY OF INVENTION

Technical Problem

However, the above-described copolymer emulsion for vibration damping materials does not provide sufficient vibration damping property required for practical use, and there is room for developing a composition for vibration damping materials which exhibits higher vibration damping property.

The present invention has been made in view of the state of the art, and aims to provide a composition for vibration damping materials which exhibits excellent vibration damping property.

Solution to Problem

The present inventors have performed various studies on a composition for vibration damping materials which exhibits excellent vibration damping property in the practical temperature range, and have found that a compound having 7 or more carbon atoms, a boiling point of 190° C. or higher, and at least two ether groups or at least two ester groups in the molecule acts as a vibration damping modifier for a polymer emulsion. Further, the present inventors have found that a composition prepared by adding such a compound to a polymer emulsion provides a coating that can exhibit excellent vibration damping property. Thus, the present inventors admirably solved the above problems, thereby completing the present invention.

That is, the present invention includes an emulsion composition for vibration damping materials including:

a vibration damping modifier including a compound that has 7 or more carbon atoms, a boiling point of 190° C. or higher, and at least two ether groups or at least two ester groups in the molecule; and a polymer emulsion.

The present invention is described in more detail below.

Preferred embodiments according to the present invention include a combination of two or more of the preferred embodiments according to the present invention described below.

The emulsion composition for vibration damping materials of the present invention comprises a vibration damping modifier including a compound (hereinafter, also referred to as a compound A) that has 7 or more carbon atoms, a boiling point of 190° C. or higher, and at least two ether groups or at least two ester groups in the molecule; and a polymer emulsion. The emulsion composition may contain one or more species of compounds having 7 or more carbon atoms, a boiling point of 190° C. or higher, and at least two ether groups or at least two ester groups in the molecule, and one or more species of polymer emulsions.

The emulsion composition for vibration damping materials of the present invention may contain one or more species of compounds A as a vibration damping modifier.

The number of carbon atoms of the compound A is not particularly limited as long as the compound A has 7 or more carbon atoms in the molecule. The number of carbon atoms is preferably 7 to 50, more preferably 7 to 40, and still more preferably 7 to 35.

The compound A contains at least two ether groups or at least two ester groups. This means that the compound A contains two or more ether groups or two or more ester groups. The compound A may have other group(s) as long as the compound A has two or more ether groups or two or more ester groups.

The boiling point in the present invention refers to a boiling point at 1 atm. As for a compound that decomposes under boiling point at 1 atm, the boiling point is determined as the following: boiling points under reduced pressure of the compound are measured, and converted into the boiling point at 1 atm based on a nomograph (boiling-point conversion chart) or using the Antoine equation.

The Antoine equation is represented by the following formula (1) in which p represents a vapor pressure and T represents a temperature. A, B, and C represent constants specific to a compound. A boiling point at atmospheric pressure can be determined by calculating the Antoine constants (A, B, C) from three or more actual measurement values of vapor pressure.

[Formula 1]

$$\log_{10} p = A - \frac{B}{T+C} \tag{1}$$

As for the compound that has 7 or more carbon atoms, a boiling point of 190° C. or higher, and at least two ether groups or at least two ester groups, a compound (A-1) that has a boiling point of 190° C. or higher and a solubility of 3 to 120 g in 100 g of water, or a compound (A-2) that has a boiling point of 260° C. or higher and ester group in the molecule is preferably used. Or both compounds may be used together as a vibration damping modifier.

Use of the compound (A-1) as the compound A enables more sufficient improvement in vibration damping property in the temperature range of 20° C. to 60° C. Usually, addition of a solvent to the emulsion composition for vibration damping materials causes a decrease in Tg of a coating of the composition to degrade the vibration damping performance in the high temperature range of 40° C. to 60° C., or to narrow the temperature range in which vibration damping property are exhibited. However, addition of the compound (A-1) causes no decrease in Tg of a coating of the composition, or only a small decrease in Tg. Therefore, no degradation of the vibration damping performance is observed in the high temperature range, or the degradation thereof is sufficiently small. Thus, the sufficient vibration damping performance can be exhibited even in the high temperature range. The compound (A-1), which is water-soluble, does not penetrate into polymer particles, and the effect of plasticization (decrease in Tg) is therefore small. However, it is presumed that, after a coating is dried, the compound (A-1) exists on the surface of the polymer particles and imparts flexibility to the coating.

Further, the formation of bubbles during baking of a coating is likely to be prevented (the porosity of the coating is reduced) by adding the compound (A-1) or (A-2). Thereby, the strength of the coating and the adhesion of the coating to a base are improved. Therefore, even when the emulsion composition for vibration damping materials of the present invention is used for automobiles or railway vehicles, which are likely to be subjected to vibration or impacts, break or peel off of a coating is restricted, and the coating exhibits favorable vibration damping property.

The compound (A-1) has a solubility of preferably 5 to 100 g in 100 g of water, more preferably a solubility of 6 to 80 g in 100 g of water, and still more preferably a solubility of 10 to 80 g in 100 g of water.

Examples of the compound (A-1) include dipropylene glycol-n-butyl ether, dipropylene glycol monopropyl ether, dipropylene glycol methyl ether acetate, propylene glycol methyl ether acetate, and propylene glycol diacetate.

The compound (A-2) has a boiling point of 260° C. or higher, preferably has a boiling point of 300° C. or higher, more preferably has a boiling point of 400° C. or higher.

The compound (A-2) preferably has a diester structure. Examples of such a compound include dibutyl phthalate, dioctyl phthalate, diisononyl phthalate, dimethyl phthalate, diethyl phthalate, diisodecyl phthalate, dioctyl adipate, diisononyl adipate, and diisodecyl adipate. In particular, a compound containing an aromatic ring in the molecule is still more preferred.

The amount of the vibration damping modifier is preferably 0.1% to 40% by mass based on 100% by mass of a monomer component which is a raw material of the polymer emulsion in the emulsion composition for vibration damping materials. The composition containing such an amount of the vibration damping modifier exhibits more sufficient effects obtained by comprising the vibration damping modifier. The amount of the vibration damping modifier is more preferably 0.5% to 30% by mass, still more preferably 0.5% to 20% by mass, and particularly preferably 0.5% to 15% by mass, based on 100% by mass of the monomer component.

The phrase "amount of the vibration damping modifier" herein means, when the emulsion composition for vibration damping materials contains only one compound as the vibration damping modifier, the amount of the one compound, and when the emulsion composition for vibration damping materials contains two or more compounds as the vibration damping modifier, the total amount of the two or more compounds.

The polymer emulsion of the emulsion composition for vibration damping materials of the present invention preferably includes an aqueous medium and a polymer (hereinafter, also referred to as a polymer (A)) in the polymer emulsion.

The monomer component which is a raw material of the polymer (polymer A) in the polymer emulsion in the present invention is not particularly limited as long as the monomer component provides the effects of the present invention. The monomer component preferably includes an unsaturated carboxylic acid monomer. More preferably, the monomer component includes an unsaturated carboxylic acid monomer and other monomer(s) copolymerizable with the unsaturated carboxylic acid monomer. The unsaturated carboxylic acid monomer may be any compound that contains an unsaturated bond and a carboxyl group in the molecule. The unsaturated carboxylic acid monomer preferably contains an ethylenically unsaturated carboxylic acid monomer.

Examples the ethylenically unsaturated carboxylic acid monomer include, but are not particularly limited to, unsaturated carboxylic acids such as (meth)acrylic acid, crotonic acid, itaconic acid, citraconic acid, fumaric acid, maleic acid, maleic anhydride, monomethyl fumarate, monoethyl fumarate, monomethyl maleate, or monoethyl maleate, and derivatives thereof. One or more of these may be used. Among these, a (meth)acrylic acid monomer such as (meth) acrylic acid is preferred. That is, the preferred embodiments of the present invention include an embodiment in which the polymer (polymer (A)) in the polymer emulsion is a (meth) acrylic polymer in which the monomer component includes at least one (meth)acrylic acid monomer.

In particular, the (meth)acrylic polymer obtained from a monomer component that includes a (meth)acrylic acid monomer is preferred. Further, the (meth)acrylic polymer of the present invention is preferably obtained from a monomer component that includes at least one monomer represented by $C(R^4)_2=CH-COOR^5$ or $C(R^6)_2=C(CH_3)-COOR^7$ ($R^4$, $R^5$, $R^6$, and $R^7$ are the same as or different from one another, and each represent hydrogen atom, a metal atom, ammonium group, or an organic amine group).

The (meth)acrylic acid monomer herein is a monomer containing a —COOH group, and an acryloyl group, a methacryloyl group, or a group obtained by replacing a hydrogen atom of an acryloyl group or a methacryloyl group with another atom or another atomic group. The (meth) acrylic monomer herein is a monomer containing an ester or salt of a —COOH group, and an acryloyl group, a methacryloyl group, or a group obtained by replacing a hydrogen atom of an acryloyl group or a methacryloyl group with another atom or another atomic group. The (meth)acrylic monomer also includes a derivative of such a monomer.

It is preferable that the monomer component which is a raw material of the (meth)acrylic polymer includes 0.1% to 20% by mass of a (meth)acrylic acid monomer and 80% to 99.9% by mass of other copolymerizable ethylenically unsaturated monomer(s), based on 100% by mass of the entire monomer component. Using the (meth)acrylic acid monomer improves the dispersibility of a filler such as inorganic powders in the emulsion composition for vibration damping materials of the present invention that includes the polymer emulsion. Thereby, the vibration damping property are further improved. Furthermore, using the other copolymerizable ethylenically unsaturated monomer(s) enable(s) easy adjustment of an acid value, a Tg, physical property, and the like, of the polymer. The monomer component in which the amount of the (meth)acrylic acid monomer is adjusted within the range of from 0.1% to 20% by mass can be stably copolymerized. Monomer units formed from these monomers generate synergistic effects in the (meth)acrylic polymer in the polymer emulsion. Therefore, a resulting aqueous vibration damping material can show excellent coating appearance and sufficiently exhibit vibration damping property.

More preferably, the monomer component includes 0.5% to 3% by mass of a (meth)acrylic acid monomer and 97% to 99.5% by mass of other copolymerizable ethylenically unsaturated monomer(s) based on 100% by mass of the entire monomer component.

Examples of the other copolymerizable ethylenically unsaturated monomer(s) include (meth)acrylic monomers other than the (meth)acrylic acid monomer, aromatic ring-containing unsaturated monomers, nitrogen-containing unsaturated monomers, and other monomers copolymerizable with the (meth)acrylic acid monomer.

Examples of the (meth)acrylic monomers other than the (meth)acrylic acid monomer include methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tent-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, isooctyl acrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, vinyl formate, vinyl acetate, vinyl propionate, 2-hydroxyethyl acrylate, 2-hydroxyethyl methacrylate, 2-hydroxypropyl acrylate, 2-hydroxypropyl methacrylate, diallyl phthalate, triallyl cyanurate, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, allyl acrylate, allyl methacrylate, and salts and esterified products thereof. One or more of these may be preferably used.

Preferred examples of the salts include metal salts, ammonium salts, and organic amine salts. Preferred examples of the metal atom of the metal salts include monovalent metal atoms such as alkali metal atoms (e.g. lithium, sodium, potassium); divalent metal atoms such as alkaline-earth metal atoms (e.g. calcium, magnesium); and trivalent metal atoms such as aluminum or iron. Preferred examples of the organic amine salts include alkanolamine salts such as an ethanolamine salt, a diethanolamine salt, or a triethanolamine salt; and a triethylamine salt.

The monomer component which is a raw material of the (meth)acrylic polymer preferably includes the (meth)acrylic monomer in an amount of 20% by mass or more and more preferably 30% by mass or more, based on 100% by mass of the entire monomer component.

Examples of the aromatic ring-containing unsaturated monomer include divinylbenzene, styrene, α-methyl styrene, vinyl toluene, and ethyl vinyl benzene. Styrene is preferred.

That is, the preferred embodiments of the present invention further include an embodiment in which the polymer (polymer (A)) in the polymer emulsion is a styrene-(meth) acrylic polymer obtained from a monomer component including styrene.

When the polymer (polymer (A)) in the polymer emulsion includes a styrene-(meth)acrylic polymer, the monomer component preferably includes the aromatic ring-containing unsaturated monomer in an amount of preferably 1% to 70% by mass, more preferably 5% to 60% by mass, and still more preferably 10% to 40% by mass, based on 100% by mass of the entire monomer component. The monomer component which is a raw material of the polymer (A) may not include an aromatic ring-containing unsaturated monomer.

Examples of the nitrogen-containing unsaturated monomer include acrylonitrile, methylacrylonitrile, 2-vinyl pyrrolidone, acryloylmorpholine, acrylamide, methacrylamide, and diacetone acrylamide. Acrylonitrile is preferred.

The polymer (polymer (A)) in the polymer emulsion may preferably be obtained from a monomer component including a polar group-containing monomer.

A group generally regarded as a polar group of an organic compound may be used as the polar group of the polar group-containing monomer, and the polar group is preferably at least one selected from the group consisting of a hydroxyl group, a nitrile group, a carboxyl group, and a pyrrolidone group. A nitrile group and/or a carboxyl group are more preferred.

When the monomer component which is a raw material of the polymer (polymer (A)) in the polymer emulsion includes the polar group-containing monomer, the amount of the polar group-containing monomer is preferably 0.1% to 10% by mass, more preferably 0.3% to 5% by mass, and still more preferably 0.5% to 2% by mass, based on 100% by mass of the entire monomer component.

The monomer component which forms the (meth)acrylic polymer may further include a functional group-containing unsaturated monomer. Examples of the functional group of the functional group-containing unsaturated monomer include an epoxy group, a glycidyl group, an oxazoline group, a carbodiimide group, an aziridinyl group, an isocyanate group, a methylol group, a vinyl ether group, a cyclocarbonate group, and an alkoxysilane group. One or more of these functional groups may be present in one molecule of the unsaturated monomer. Examples of the functional group-containing unsaturated monomer include glycidyl group-containing unsaturated monomers such as glycidyl (meth)acrylate or acrylic glycidyl ether. Each of these may be used alone, or two or more of these may be used in combination.

Examples of the polyfunctional unsaturated monomer containing two or more functional groups include divinylbenzene, ethylene glycol di(meth)acrylate, N-methoxymethyl(meth)acrylamide, N-methxoyethyl(meth)acrylamide, N-n-butoxymethyl(meth)acrylamide, N-i-butoxymethyl (meth)acrylamide, N-methylol(meth)acrylamide, diallyl phthalate, diallyl terephthalate, polyethylene glycol di(meth)acrylate, propylene glycol di(meth)acrylate, polypropylene glycol di(meth)acrylate, tetramethylene glycol di(meth)acrylate, polytetramethylene glycol di(meth)acrylate, 1,6-hexanediol di(meth)acrylate, and neopentyl glycol di(meth)acrylate.

The monomer component which is a raw material of the polymer (polymer (A)) in the polymer emulsion preferably includes a (meth)acrylic acid monomer and/or a (meth)acrylic monomer, in terms of vibration damping property and workability.

Thus, the polymer emulsion is preferably a (meth)acrylic polymer emulsion obtained by emulsion polymerization of a monomer component including a (meth)acrylic acid monomer and/or a (meth)acrylic monomer.

The polymer emulsion preferably includes a polymer emulsion obtained by emulsion polymerization of a monomer component that includes a monomer whose homopolymer has a glass transition temperature of 100° C. or higher. Such a polymer emulsion can be sufficiently improved in vibration damping property in a wide temperature range by adding thereto the above-described vibration damping modifier, particularly, the compound (A-1) and/or the compound (A-2).

The polymer emulsion obtained by emulsion polymerization of the monomer component that includes a monomer whose homopolymer has a glass transition temperature of 100° C. or higher contains the monomer whose homopolymer has a glass transition temperature of 100° C. or higher in an amount of preferably 20% to 80% by mass and more preferably 30% to 70% by mass, based on 100% by mass of the monomer component.

In the emulsion composition for vibration damping materials which contains the vibration damping modifier and the polymer emulsion obtained by emulsion polymerization of the monomer component that includes a monomer whose homopolymer has a glass transition temperature of 100° C. or higher, the amount of the vibration damping modifier is preferably 0.1% to 50% by mass based on 100% by mass of the monomer whose homopolymer has a glass transition temperature of 100° C. or higher. The coating obtained from the emulsion composition for vibration damping materials which contains such an amount of the vibration damping modifier is excellent in strength, adhesion to a base material and it can exhibit more favorable vibration damping property. The amount of the vibration damping modifier is more preferably 1% to 40% by mass, still more preferably 2% to 35% by mass, particularly preferably 3% to 30% by mass, and most preferably 3% to 20% by mass.

The meaning of the phrase "the amount of the vibration damping modifier" is the same as described above.

In the emulsion composition for vibration damping materials of the present invention, the monomer component which is a raw material of the polymer emulsion preferably includes butyl acrylate and/or 2-ethylhexyl acrylate, more preferably includes butyl acrylate and 2-ethylhexyl acrylate.

The total amount of butyl acrylate and 2-ethylhexyl acrylate in the monomer component is preferably 20% to 60% by mass and more preferably 30% to 50% by mass, based on 100% by mass of the monomer component which is a raw material of the polymer emulsion.

The phrase "the total amount of butyl acrylate and 2-ethylhexyl acrylate in the monomer component" means, when the monomer component only includes butyl acrylate, the amount of butyl acrylate, and when the monomer component only includes 2-ethylhexyl acrylate, the amount of 2-ethylhexyl acrylate.

In the present invention, as described above, the polymer (polymer (A)) in the polymer emulsion may include one or two or more polymers. Further, the polymer (A) may include two or more polymers in the form of a composite. When the polymer (A) is in the form of a below-described core-shell structure, the polymer (A) may include two polymers in which one polymer forms a core part and the other forms a shell part. For example, the unsaturated carboxylic acid monomer and the other monomer(s) copolymerizable therewith may be contained in a core-forming monomer component or a shell-forming monomer component, or may be contained in both.

The polymer in the polymer emulsion preferably includes at least one polymer in the form of core-shell emulsion particles. By using the polymer in the form of core-shell emulsion particles, the interface among polymers can be increased to enhance the effects of improving the vibration damping property and the like.

In the core-shell composite structure, a core part surface is preferably covered with a shell part. In this case, the core part surface is preferably completely covered with a shell part, or may not be completely covered therewith. For example, the core part surface may be covered in a mesh pattern or covered to be partly exposed.

When the polymer (polymer (A)) in the polymer emulsion includes at least one polymer in the form of core-shell emulsion particles, the difference in glass transition temperature (Tg) between a polymer obtained from a core part-forming monomer component and a polymer obtained from a shell part-forming monomer component is preferably 5° C. to 60° C. When a polymer having such a difference in glass transition temperature (Tg) is used for a vibration damping material, higher vibration damping property can be exhibited in a wide temperature range, and in particular, the vibration damping property are further improved in the practical range of from 20° C. to 60° C. The difference in glass transition temperature (Tg) is more preferably 5° C. to 50° C. and still more preferably 5° C. to 40° C.

The Tg of the polymer obtained from the monomer component including the core part-forming monomer component and the shell part-forming monomer component is preferably −20° C. to 40° C., more preferably −15° C. to 35° C., and still more preferably −10° C. to 30° C.

The core-shell emulsion particles can be prepared by the emulsion polymerization (multi-stage polymerization) as described below.

When the polymer (polymer (A)) in the polymer emulsion of the present invention is a (meth)acrylic polymer and is in the form of a core-shell structure, the (meth)acrylic acid monomer and the ethylenically unsaturated monomer copolymerizable with the (meth)acrylic acid monomer may be contained in any of a monomer component forming a core part of the emulsion and a monomer component forming a shell part of the emulsion, or may be contained in both. The proportion of each monomer in the core part-forming monomer component and the proportion of each monomer in the shell part-forming monomer component are the same as described above.

When the polymer (polymer (A)) in the polymer emulsion includes at least one polymer in the form of core-shell emulsion particles, the mass ratio of the core part-forming monomer component to the shell part-forming monomer component (core part-forming monomer component/shell part-forming monomer component) is preferably 30/70 to 70/30. The polymer having such a mass ratio exhibits the effects obtained from a core-shell structure more sufficiently. The mass ratio of a core part-forming monomer component to a shell part-forming monomer component is more preferably 35/65 to 65/35 and still more preferably 35/65 to 55/45.

The polymer (polymer (A)) in the polymer emulsion preferably has a weight average molecular weight of 20,000 to 800,000. For exhibiting vibration damping property, it is preferable to convert energy due to vibration applied to the polymer into frictional thermal energy, and the polymer needs to be movable when vibration is applied thereto. The polymer (A) having such a weight average molecular weight is sufficiently movable when vibration is applied thereto, and can exhibit high vibration damping property. The weight average molecular weight of the polymer (A) is more preferably 30,000 to 400,000.

The weight average molecular weight (Mw) can be measured by gel permeation chromatography (GPC) under the following conditions. Measuring equipment: HLC-8120GPC (trade name, produced by Tosoh Corporation)

Molecular-weight column: TSK-GEL GMHXL-L and TSK-GEL G5000HXL (both produced by Tosoh Corporation) connected in series Eluent: tetrahydrofuran (THF)

Calibration curve reference material: polystyrene (produced by Tosoh Corporation)

Measuring method: A measurement object was dissolved in THF to a solids content of about 0.2% by mass, and the resulting solution was filtered through a filter. The filtrate was measured for the molecular weights as a measurement sample.

The preferred embodiments of the present invention include an embodiment in which the polymer (polymer (A)) in the polymer emulsion is a (meth)acrylic polymer having a number average molecular weight of 25,000 or less.

The composition comprising such a polymer emulsion provides a coating having excellent vibration damping property and high strength.

That is, the preferred embodiments of the present invention include an embodiment in which the emulsion composition for vibration damping materials of the present invention includes a (meth)acrylic polymer emulsion prepared by emulsion polymerization of a monomer component, and the number average molecular weight of the (meth)acrylic polymer is 25,000 or less.

For exhibiting vibration damping property, it is preferable that the vibration energy applied to the polymer is converted into the frictional thermal energy, and the polymer needs to be movable when vibration is applied thereto. The (meth)acrylic polymer having such a number average molecular weight is sufficiently movable when vibration is applied thereto, and can exhibit high vibration damping property. Further, the emulsion composition for vibration damping materials containing the (meth)acrylic polymer having such a number average molecular weight provides a coating with high strength.

Use of the emulsion of a (meth)acrylic polymer having a number average molecular weight of 25,000 or less in the emulsion composition for vibration damping materials is technically important in the present invention. The present invention includes all of the emulsion composition for vibration damping materials which contains a (meth)acrylic polymer having a number average molecular weight of 25,000 or less, a coating formed from the emulsion composition for vibration damping materials, and a method for producing the emulsion composition for vibration damping materials using a (meth)acrylic polymer having a number average molecular weight of 25,000 or less.

The number average molecular weight of the (meth)acrylic polymer having a number average molecular weight of 25,000 or less is preferably 22,000 or less. The acrylic polymer having such a number average molecular weight provides an emulsion composition for vibration damping materials having better vibration damping property. The number average molecular weight is more preferably 20,000 or less. Further, the number average molecular weight is preferably 10,000 or more and more preferably 15,000 or more.

The number average molecular weight can be measured by gel permeation chromatography (GPC) under the same conditions as those in measurement of the weight average molecular weight (Mw) of the polymer (A).

The (meth)acrylic polymer preferably has a molecular weight distribution of 3.0 or less. Most of polymers included in the (meth)acrylic polymer having such a molecular weight distribution have a number average molecular weight near the preferred one, and the vibration energy applied to the polymer can be effectively converted into the frictional thermal energy. Therefore, better vibration damping property can be exhibited. The molecular weight distribution is more preferably 2.5 or less and still more preferably 2.3 or less.

The molecular weight distribution is represented by weight average molecular weight/number average molecular weight.

The polymer (polymer (A)) in the polymer emulsion preferably has a glass transition temperature of −20° C. to 40° C. Use of the polymer (A) having such a glass transition temperature can effectively impart the vibration damping performance in the practical temperature range of the vibration damping material. The glass transition temperature of the polymer (A) is more preferably −15° C. to 35° C. and still more preferably −10° C. to 30° C.

The glass transition temperature (Tg) may be determined based on already acquired knowledge, or may be controlled depending on the species or used amounts of the respective monomer components described below. However, the Tg can be calculated from the following formula (2), theoretically.

[Formula 2]

$$\frac{1}{Tg'} = \left[ \frac{W_1'}{T_1} + \frac{W_2'}{T_2} + \ldots + \frac{W_n'}{T_n} \right] \quad (2)$$

In the formula, Tg' represents a Tg (absolute temperature) of the polymer; $W_1'$, $W_2'$, and ... $W_n'$ each represent a mass fraction of each monomer relative to the entire monomer component; and $T_1$, $T_2$, and ... $T_n$ each represent a glass transition temperature (absolute temperature) of the homopolymer of each monomer component.

When the polymer (polymer (A)) in the polymer emulsion of the present invention is a (meth)acrylic polymer and is in the form of a core-shell structure, the glass transition temperature of the polymer as a core part is preferably 0° C. to 60° C. and more preferably 10° C. to 50° C.

The glass transition temperature of the polymer as a shell part is preferably −30° C. to 30° C. and more preferably −20° C. to 20° C.

The difference in glass transition temperature between the polymer as a core part and the polymer as a shell part is preferably 5° C. to 60° C. When a polymer having such a difference in glass transition temperature is used for a vibration damping material, higher vibration damping property can be exhibited in the wide temperature range, and in particular, the vibration damping property are further improved in the practical range of from 20° C. to 60° C. The difference in glass transition temperature is more preferably 5° C. to 50° C. and still more preferably 5° C. to 40° C.

The average particle size of the emulsion particles in the polymer emulsion is preferably 80 to 450 nm.

Use of the emulsion particles having an average particle size in the above range can achieve better vibration damping property as well as sufficient basic performances required for the vibration damping material, such as coating appearance or coating formability. The upper limit of the average particle size is more preferably 400 nm or less and still more preferably 350 nm or less. When the average particle size of the emulsion particles is within such a range, the effects of the emulsion composition for vibration damping materials are more effectively exhibited. The lower limit of the average particle size thereof is more preferably 100 nm or more.

The average particle size (volume average particle size) can be measured in the following way, for example: the emulsion is diluted with distilled water and then sufficiently mixed by stirring, and about 10 ml of the mixture is then put into a glass cell and subjected to measurement by a dynamic light scattering method with a particle size distribution analyzer (NICOMP Model 380, produced by Particle Sizing Systems).

The emulsion particles with the above average particle size have a particle size distribution, which is defined as a value obtained by dividing a standard deviation by a volume average particle size thereof (standard deviation/volume average particle size×100), of preferably 40% or less and more preferably 30% or less. The emulsion particles having a particle size distribution in the above range do not contain coarse particles. As a result, the emulsion composition for vibration damping materials can provide sufficient heat-drying property.

The emulsion composition for vibration damping materials of the present invention may contain other component(s) as long as it contains a vibration damping modifier and a polymer emulsion.

When the emulsion composition for vibration damping materials contains other component(s), the amount of the other component(s) is preferably 10% by mass or less and more preferably 5% by mass or less, based on the entire emulsion composition for vibration damping materials. The other component(s) herein refer(s) to a nonvolatile component (solids content) left in a coating obtained by applying the emulsion composition for vibration damping materials and heating and drying the applied composition. The other component(s) do/does not include an aqueous medium.

The solids content of the emulsion composition for vibration damping materials of the present invention is preferably 40% to 80% by mass and more preferably 50% to 70% by mass, in the entire emulsion composition for vibration damping materials.

The amount of the (meth)acrylic polymer in the emulsion composition for vibration damping materials is set so that, for example, the solids content of the (meth)acrylic polymer is preferably 10% to 60% by mass and more preferably 15% to 60% by mass, in 100% by mass of the solids content of the emulsion composition for vibration damping materials.

The solids content herein refers to components contained in the emulsion composition for vibration damping materials, excluding an aqueous medium.

The pH of the emulsion composition for vibration damping materials is not particularly limited, and preferably 2 to 10, more preferably 3 to 9.5, and still more preferably 7 to 9. The pH of the polymer emulsion can be adjusted by adding ammonia water, a water-soluble amine, an alkali hydroxide aqueous solution, or the like, to the polymer emulsion.

The pH herein can be measured with a pH meter. For example, the pH at 25° C. is preferably measured with a pH meter ("F-23" produced by HORIBA, Ltd.).

The viscosity of the emulsion composition for vibration damping materials is not particularly limited, and preferably 1 to 10,000 mPa·s, more preferably 5 to 5,000 mPa·s, much more preferably 5 to 2,000 mPa·s, still more preferably 5 to 1500 mPa·s, still much more preferably 5 to 1,000 mPa·s, particularly preferably 5 to 500 mPa·s, more particularly preferably 10 to 500 mPa·s, more particularly preferably 20 to 500 mPa·s, and most preferably 50 to 500 mPa·s.

The viscosity can be measured under the conditions of 25° C. and 30 min$^{-1}$ with a B type rotational viscometer.

The polymer emulsion is produced by emulsion polymerization of the monomer component in the presence of an emulsifier. The embodiment of the emulsion polymerization is not particularly limited. For example, the emulsion polymerization can be performed while appropriately adding the monomer component, a polymerization initiator, and an emulsifier to an aqueous medium. A polymerization chain transfer agent or the like is preferably used to control the molecular weight.

When the polymer emulsion is a core-shell emulsion, it is preferably obtained by a common emulsion polymerization method. Specifically, the core-shell emulsion is preferably produced by multi-stage polymerization in which a monomer component is emulsion polymerized in an aqueous medium to form a core part and a monomer component is further added and emulsion polymerized with an emulsion containing the core part to form a shell part, in the presence of an emulsifier and/or a protective colloid. Thus, the preferred embodiments of the present invention include an embodiment in which the polymer emulsion is a core-shell emulsion which is obtainable by multi-stage polymerization in which a core part is formed, followed by a shell part.

Examples of the aqueous medium include, but are not particularly limited to, water, a water-miscible solvent, a mixed solvent of two or more water-miscible solvents, and a mixed solvent containing water as a main component and the water-miscible solvent. Among these, water is preferred, considering the safety or influence on environment in application of the coating material containing the polymer emulsion of the present invention.

The amount of the emulsifier used is preferably 0.1% to 10% by mass based on 100% by mass of the entire compound containing a polymerizable unsaturated bond group in view of polymerization stability. Use of 0.1% by mass or more of the emulsifier provides favorable mechanical stability and polymerization stability. The amount of the emulsifier is more preferably 0.5% to 5% by mass and still more preferably 1% to 3% by mass. Use of the emulsifier in an amount in the above range sufficiently improves the mechanical stability and maintains the polymerization stability.

Examples of the emulsifier include anionic, cationic, nonionic, amphoteric, and polymeric surfactants. One or more of these may be used.

Examples of the anionic surfactant include, but are not particularly limited to, polyoxyalkylene alkyl ether sulfates, sodium polyoxyalkylene oleyl ether sulfates, polyoxyalkylene alkyl phenyl ether sulfates, alkyl diphenyl ether disulfonates, polyoxyalkylene (mono, di, tri) styryl phenyl ether sulfates, polyoxylalkylene (mono, di, tri) benzyl phenyl ether sulfates, and alkenyl disuccinates; alkyl sulfates such as sodium dodecyl sulfate, potassium dodecyl sulfate, or ammonium alkyl sulfate; sodium dodecyl polyglycol ether sulfate; sodium sulfolisinolate; alkyl sulfonates such as salts of sulfonated paraffin; alkyl sulfonates such as sodium dodecylbenzene sulfonate or alkali metal sulfates of alkali phenol hydroxyethylene; higher alkyl naphthalene sulfonates; a naphthalene sulfonic acid-formalin condensate; fatty acid salts such as sodium laurate, triethanol amine oleate, or triethanol amine abietate; polyoxyalkyl ether sulfates; polyoxyethylene carboxylate sulfates; polyoxyethylene phenyl ether sulfates; dialkyl sulfosuccinates; and polyoxyethylene alkyl aryl sulfates. One or more of these may be used.

Preferred examples of commercial products of the anionic surfactant include LATEMUL WX, LATEMUL 118B, PELEX SS-H, EMULGEN A-60, B-66, LEVENOL WZ, and EMAL O (product of Kao Corporation); NEWCOL 707SF, NEWCOL 707SN, NEWCOL 714SF, and NEWCOL 714SN (product of Nippon Nyukazai Co., Ltd.), ABEX-26S, ABEX-2010, 2020, 2030, and DSB (product of Rhodia Nikka Co., Ltd.); and HITENOL 18E and HITENOL NF-08 (product of DAI-ICHI KOGYO SEIYAKU CO., LTD.).

Further, nonionic surfactants corresponding to these surfactants can also be used.

A reactive surfactant may be used as the anionic surfactant. Examples of the reactive surfactant include reactive anionic surfactants, sulfosuccinate-type reactive anionic surfactants, and alkenyl succinate-type reactive anionic surfactants. One or more of these may be used.

Examples of commercial products of the sulfosuccinate-type reactive anionic surfactants include LATEMUL S-120, S-120A, S-180, and S-180A (trade name, product of Kao Corp.), ELEMINOL JS-2 (trade name, product of Sanyo Chemical Industries, Ltd.), and ADEKA-REASOAP SR-10, SR-20, and SR-30 (trade name, product of ADEKA Corp.).

Examples of commercial products of the alkenyl succinate-type reactive anionic surfactants include LATEMUL ASK (trade name, product of Kao Corp.).

Further, polyoxyethylene(meth)acrylate sulfonates (e.g. "ELEMINOL RS-30" product of Sanyo Chemical Industries, Ltd., ANTOX MS-60" product of Nippon Nyukazai Co., Ltd.), allyl group-containing sulfates (salts) such as sulfonate salts of allyloxymethyl alkyloxy polyoxyethylene (e.g. "AQUALON KH-10" product of DAI-ICHI KOGYO SEIYAKU CO., LTD.), and polyoxyalkylene alkenyl ether ammonium sulfate (e.g. "LATEMUL PD-104" product of Kao Corp.) may also be used.

Further the following reactive surfactants may be used as the anionic surfactant.

Examples of the reactive surfactant include salts of sulfoalkyl (C1-C4) esters of C3-C5 aliphatic unsaturated carboxylic acids, such as salts of sulfoalky(meth)acrylate (e.g. sodium 2-sulfoethyl(meth)acrylate, ammonium 3-sulfopropyl(meth)acrylate); and salts of alkyl sulfoalkyl diesters of aliphatic unsaturated dicarboxylic acids (e.g. sodium alkyl sulfopropylmaleate, ammmonium polyoxyethylene alkyl sulfopropylmaleate, or ammonium polyoxyethylene alkyl sulfoethylfumarate).

Examples of the nonionic surfactant include, but are not particularly limited to, polyoxyethylene alkyl ethers; polyoxyethylene alkylaryl ethers; sorbitan aliphatic esters; polyoxyethylene sorbitan aliphatic esters; aliphatic monoglycerides such as glycerol monolaurate; a polyoxyethylene-oxypropylene copolymer; and a condensate of ethylene oxide with an aliphatic amine, amide, or acid. For example, EMULGEN 1118S (product of Kao Corporation) is commercially available as the nonionic surfactant. Also reactive nonionic surfactants such as allyloxymethyl alkoxy ethyl hydroxy polyoxyethylene (e.g. "ADEKA-REASOAP ER-20" product of ADEKA Corp.); and polyoxyalkylene alkenyl ether (e.g. "LATEMUL PD-420", "LATEMUL PD-430", product of Kao Corp.) may be used. One or more of these may be used.

Examples of the cationic surfactant include, but are not particularly limited to, dialkyl dimethyl ammonium salts, ester type dialkyl ammonium salts, amide type dialkyl ammonium salts, and dialkylimidazolinium salts. One or more of these may be used.

Examples of the amphoteric surfactant include, but are not particularly limited to, alkyl dimethyl aminoacetic acid betaine, alkyl dimethyl amine oxide, alkyl carboxymethyl hydroxyethyl imidazolinium betaine, alkyl amide propyl betaine, and alkyl hydroxy sulfobetaine. One or more of these may be used.

Examples of the polymeric surfactant include, but are not particularly limited to, polyvinyl alcohols and modified products thereof; (meth)acrylic water-soluble polymers; hydroxyethyl(meth)acrylic water-soluble polymers; hydroxypropyl(meth)acrylic water-soluble polymers; and polyvinyl pyrrolidone. One or more of these may be used.

Among the surfactants, an ethylene oxide chain-containing anionic surfactant is preferably used. Use of an ethylene oxide chain-containing anionic surfactant provides a coating excellent in coating appearance and vibration damping property, with favorable workability.

Among the surfactants, a non-nonylphenyl surfactant is preferably used in view of influence on environment.

The amount of the surfactant may be appropriately determined depending on, for example, the type of the surfactant or a monomer component to be used. As the minimum amount needed to obtain stability during polymerization or storage stability after polymerization, for example, the amount of the surfactant is preferably 0.1 to 10 parts by mass, more preferably 0.5 to 5 parts by mass, and still more preferably 1 to 3 parts by mass, based on 100 parts by mass of the entire monomer component for forming the polymer.

Examples of the protective colloid include polyvinyl alcohols such as partially saponified polyvinyl alcohols, completely saponified polyvinyl alcohols, or modified polyvinyl alcohols; cellulose derivatives such as hydroxyethyl cellulose, hydroxypropyl cellulose, and salt of carboxymethyl cellulose; and natural polysaccharides such as guar gum. One or more of these may be used. The protective colloid may be used alone or in combination with a surfactant.

The amount of the protective colloid is appropriately determined depending on use conditions. For example, the amount of the protective colloid is preferably 5 parts by mass or less and more preferably 3 parts by mass or less, based on 100 parts by mass of the entire monomer component for forming the polymer.

The polymerization initiator may be any substance as long as it decomposes by heating to generate radical molecules. A water-soluble initiator is preferably used. Examples of the water-soluble initiator include persulfates such as potassium persulfate, ammonium persulfate, or sodium persulfate; water-soluble azo compounds such as 2,2'-azobis(2-amidinopropane)dihydrochloride or 4,4'-azobis(4-cyanopentanoic acid); thermal decomposition initiators such as hydrogen peroxide; redox polymerization initiators such as a combination of hydrogen peroxide and ascorbic acid, a combination of t-butyl hydroperoxide and rongalite, a combination of potassium persulfate and a metal salt, and a combination of ammonium persulfate and sodium hydrogen sulfite. One or more of these may be used.

The amount of the polymerization initiator is not particularly limited and is appropriately determined depending on the type or the like of the polymerization initiator. For example, the amount of the polymerization initiator is preferably 0.1 to 2 parts by mass and more preferably 0.2 to 1 part by mass, based on 100 parts by mass of the entire monomer component for forming the polymer.

A reducing agent may be used in combination with the polymerization initiator, if necessary, in order to accelerate the emulsion polymerization. Examples of the reducing agent include reducing organic compounds such as ascorbic acid, tartaric acid, citric acid, or glucose; and reducing inorganic compounds such as sodium thiosulfate, sodium sulfite, sodium bisulfite, sodium metabisulfite, sodium hydrogen sulfite, or thiourea dioxide. One or more of these may be used.

The amount of the reducing agent is not particularly limited, and preferably, for example, 0.05 to 1 part by mass based on 100 parts by mass of the entire monomer component for forming the polymer.

Further, the mole ratio of the polymerization initiator to the reducing agent blended (polymerization initiator/reducing agent) is preferably 1.0 to 2.0, more preferably 1.2 to 1.9, and still more preferably 1.2 to 1.8.

Examples of the polymerization chain transfer agent include, but are not particularly limited to, alkyl mercaptans such as hexyl mercaptan, octyl mercaptan, n-dodecyl mercaptan, t-dodecyl mercaptan, n-hexadecyl mercaptan, or n-tetradecyl mercaptan; halogenated hydrocarbons such as carbon tetrachloride, carbon tetrabromide, or ethylene bromide; alkyl mercaptocarboxylates such as 2-ethylhexyl mercaptoacetate, 2-ethylhexyl mercaptopropionate, or tridecyl mercaptopropionate; alkoxy alkyl mercaptocarboxylates such as methoxybutyl mercaptoacetate or methoxybutyl mercaptopropionate; mercaptoalkyl carboxylates such as 2-mercaptoethyl octanoate; α-methylstyrene dimer, terpinolene, α-terpinene, γ-terpinene, dipentene, anisole, or allyl alcohol. Each of these may be used alone, or two or more of these may be used in combination. Among these, preferred are alkylmercaptans such as hexylmercaptan, octylmercaptan, n-dodecylmercaptan, t-dodecylmercaptan, n-hexadecylmercaptan, or n-tetradecylmercaptan.

The amount of the polymerization chain transfer agent is, for example, preferably 2.0 parts by mass or less, more preferably 1.0 part by mass or less, and still more preferably 0.8 parts by mass or less, based on 100 parts by mass of the entire monomer component. The amount of the polymerization chain transfer agent is preferably 0.1 parts by mass or more and more preferably 0.3 parts by mass or more, based on 100 parts by mass of the entire monomer component.

The emulsion polymerization may be performed, if necessary, in the presence of a chelating agent such as sodium ethylenediamine tetraacetate, a dispersant such as sodium polyacrylate, or an inorganic salt. The monomer component, the polymerization initiator, or the like may be added by, for example, en bloc addition, continuous addition, or multi-stage addition. These addition methods may be appropriately employed in combination.

Regarding the emulsion polymerization conditions in the production method, the polymerization temperature is not particularly limited, and preferably 0° C. to 100° C. and more preferably 40° C. to 95° C., for example. The polymerization time is not particularly limited, and preferably 1 to 15 hours and more preferably 5 to 10 hours, for example.

The method for adding the monomer component, the polymerization initiator, or the like is not particularly limited, and may be, for example, en bloc addition, continuous addition, or multi-stage addition. These methods may be appropriately employed in combination.

In the method for producing the polymer emulsion, the emulsion produced by emulsion polymerization is preferably neutralized with a neutralizer. As a result, the emulsion can be stabilized.

Examples of the neutralizer include, but are not particularly limited, tertiary amines such as triethanolamine, 2-methyl amino ethanol, dimethylethanolamine, diethylethanolamine, or morpholine; diglycol amine and ammonia water; and sodium hydroxide. Each of these may be used alone, or two or more of these may be used in combination. Among these, a volatile base which evaporates from a coating formed from the emulsion composition for vibration damping materials essentially containing the polymer emulsion by heating is preferably used because it improves the water resistance and the like of the coating. More preferably, an amine having a boiling point of 80° C. or higher, particularly 80° C. to 360° C. is used because it provides favorable heat-drying property and improves the vibration damping property. Preferred examples of the neutralizer include tertiary amines such as triethanolamine, dimethylethanolamine, diethylethanolamine, morpholine, or diglycolamine. More preferably, an amine with a boiling point of 130° C. to 280° C. is used. The above boiling point is a boiling point at normal pressure.

The molecular weight of the neutralizer is not particularly limited, and is preferably 130 to 280 in terms of its volatility.

Further, the amine is preferably added in an amount of 0.6 to 1.4 equivalents and more preferably 0.8 to 1.2 equivalents, per equivalent of an acid group of the polymer in the polymer emulsion.

The emulsion composition for vibration damping materials of the present invention can be prepared by adding the vibration damping modifier to the polymer emulsion prepared as described above and mixing them.

Another aspect of the present invention includes a thick-film coating composition for heat-drying that contains the emulsion composition for vibration damping materials of the present invention and at least one selected from the group consisting of pigments, fillers, foaming agents, and thickeners.

Such a thick-film coating composition for heat-drying essentially including the emulsion composition for vibration damping materials of the present invention has excellent heat-drying property and it provides a vibration damping material exhibiting particularly excellent vibration damping property.

In cases where the thick-film coating composition for heat-drying contains a foaming agent, a coating formed therefrom sometimes does not have sufficient strength. However, in cases where the emulsion composition for vibration damping materials of the present invention contains a (meth)acrylic polymer having a number average molecular weight of 25,000 or less, the vibration damping coating composition can provide a coating with excellent strength even when the composition contains a foaming agent.

Another aspect of the present invention includes the thick-film coating composition for heat-drying (vibration damping coating composition) including a foaming agent and the emulsion composition for vibration damping materials of the present invention which contains a (meth)acrylic polymer having a number average molecular weight of 25,000 or less.

The thick-film coating composition for heat-drying of the present invention can be produced by blending the polymer emulsion prepared as described above, the vibration damping modifier, and at least one selected from the group consisting of pigments, fillers, foaming agents, and thickeners.

Another aspect of the present invention includes a method for producing the thick-film coating composition for heat-drying which includes the step of blending the polymer emulsion, the vibration damping modifier, and at least one selected from the group consisting of pigments, fillers, foaming agents, and thickeners.

The method for producing the thick-film coating composition for heat-drying of the present invention may include the step of blending other component(s) (4), as long as the method includes the step of blending the polymer emulsion (1), the vibration damping modifier (2), at least one (3) selected from the group consisting of pigments, fillers, foaming agents, and thickeners. These components may be added at a time, or two or three of the components (1) to (4) are added first, and the rest of the components are then added.

The thick-film coating composition for heat-drying preferably has a solids content of 40% to 90% by mass, more preferably 50% to 90% by mass, and still more preferably 60% to 90% by mass, in 100% by mass of the entire thick-film coating composition for heat-drying.

As for the content of the emulsion composition for vibration damping materials in the thick-film coating composition for heat-drying, the solids content of the emulsion composition for vibration damping materials is for example, preferably 10% to 60% by mass and more preferably 15% to 60% by mass, in 100% by mass of the solids content of the thick-film coating composition for heat-drying.

The vibration damping coating composition including a foaming agent and the emulsion composition for vibration damping materials of the present invention which contains a (meth)acrylic polymer having a number average molecular weight of 25,000 or less can be produced by blending a foaming agent, the emulsion composition for vibration damping materials of the present invention which contains a (meth)acrylic polymer having a number average molecular weight of 25,000 or less, and if necessary other component(s). Another aspect of the present invention includes such a method for producing the vibration damping coating composition which includes a step of blending a foaming agent and an emulsion containing a (meth)acrylic polymer having a number average molecular weight of 25,000 or less which is prepared by emulsion polymerization of a monomer component.

The method for producing the vibration damping coating composition including a foaming agent and the emulsion composition for vibration damping materials of the present invention which contains a (meth)acrylic polymer having a number average molecular weight of 25,000 or less may include the step of blending other component(s) such as a filler, a pigment, or a thickener, as long as the method includes the step of blending a foaming agent and an emulsion containing a (meth)acrylic polymer having a number average molecular weight of 25,000 or less which is prepared by emulsion polymerization of a monomer component. In cases where the method includes the step of blending other component(s), a foaming agent and other component(s) may be added to the (meth)acrylic polymer emulsion in any order. The method for producing the vibration damping coating composition of the present invention may include the step of adding a foaming agent to the (meth)acrylic polymer emulsion first or the step of adding other component(s) to the (meth)acrylic polymer emulsion first.

The vibration damping coating composition including a foaming agent and the emulsion composition for vibration damping materials of the present invention which contains a (meth)acrylic polymer having a number average molecular weight of 25,000 or less contains the emulsion composition for vibration damping materials of the present invention in such an amount that the solids content of the emulsion composition for vibration damping materials is preferably 10% to 60% by mass and more preferably 15% to 60% by mass, in 100% by mass of the solids content of the vibration damping coating composition.

The thick-film coating composition for heat-drying has a pH of preferably 7 to 11 and more preferably 7 to 9. The pH can be measured by the same method as described above.

The thick-film coating composition for heat-drying has a viscosity of preferably 100 to 2,000 Pa·s and more preferably 200 to 1,000 Pa·s, under the condition of 2 min$^{-1}$ (=2 rpm). The viscosity is preferably 10 to 500 Pa·s and more preferably 30 to 300 Pa·s, under the condition of 20 min$^{-1}$ (=20 rpm).

The thick-film coating composition having such a viscosity is suitable as an application type composition for vibration damping materials, which is easily applied to a base material and free from liquid sagging.

The viscosity of the thick-film coating composition for heat-drying can be measured by the same method as in the following examples.

The vibration damping coating composition including a foaming agent and the emulsion composition for vibration damping materials of the present invention which contains a (meth)acrylic polymer having a number average molecular weight of 25,000 or less has any pH, but the pH is preferably 2 to 10, more preferably 3 to 9, and still more preferably 7 to 8. The pH of the vibration damping coating composition can be adjusted by adding ammonia water, a water-soluble amine, an aqueous alkali hydroxide solution, or the like, to the resin.

The pH of the vibration damping coating composition can be measured by the same method as in the measurement of the pH of the emulsion composition for vibration damping materials.

The vibration damping coating composition including a foaming agent and the emulsion composition for vibration damping materials of the present invention which contains a (meth)acrylic polymer having a number average molecular weight of 25,000 or less may have any viscosity, but the viscosity is preferably 100 to 2,000 Pa·s and more preferably 200 to 1,000 Pa·s, under the condition of 2 min$^{-1}$ (=2 rpm).

Further, the viscosity is preferably 10 to 500 Pa·s and more preferably 30 to 300 Pa·s, under the condition of 20 min$^{-1}$ (=20 rpm).

The vibration damping coating composition having such a viscosity is suitable as an application type composition for vibration damping materials, which is easily applied to a base material and free from liquid sagging.

The viscosity can be measured under the condition of 25° C. with a B type rotational viscometer.

Examples of the other component(s) that may be added to the thick-film coating composition for heat-drying of the present invention include pigments; foaming agents; thickeners, aqueous cross-linking agents; fillers, gelling agents; dispersants; defoaming agents; colorants; rustproof pigments; plasticizers; stabilizers; wetting agents; antiseptic agents; foaming inhibitors; anti-aging agents; mildew-proofing agents; ultraviolet absorbers; and antistatic agents. One or more of these may be used.

The other component(s) can be mixed with the emulsion composition for vibration damping materials or the like, for example, by means of a butterfly mixer, planetary mixer, spiral mixer, kneader, or dissolver.

As the pigment, one or more of the colorants, antirust pigments, and the like listed below may be used. The amount of the pigment is preferably 0.2 to 700 parts by mass and more preferably 100 to 550 parts by mass, based on 100 parts by mass of the solids content of the emulsion composition for vibration damping materials.

Preferred examples of the foaming agent include a low-boiling point hydrocarbon-containing thermal expansion microcapsule, an organic foaming agent, and an inorganic foaming agent. One or more of these may be used. Examples of the thermal expansion microcapsule include Matsumoto Microsphere F-30, F-50 (product of Matsumoto Yushi-Seiyaku Co., Ltd.); and EXPANCEL WU642, WU551, WU461, DU551, DU401 (product of Japan Expancel Co., Ltd.). Examples of the organic foaming agent include azodicarbonamide, azobisisobutyronitrile, N,N-dinitrosopentamethylenetetramine, p-toluenesulfonylhydrazine, and p-oxybis(benzenesulfohydrazide). Examples of the inorganic foaming agent include sodium bicarbonate, ammonium carbonate, and silicon hydride.

The amount of the foaming agent is preferably 0.2 to 3.0 parts by mass and more preferably 0.3 to 2.0 parts by mass, based on 100 parts by mass of the solids content of the emulsion composition for vibration damping materials.

The amount of the foaming agent in the vibration damping coating composition including a foaming agent and the emulsion composition for vibration damping materials of the present invention which contains a (meth)acrylic polymer having a number average molecular weight of 25,000 or less is preferably 0.4% to 8.0% by mass and more preferably 0.6% to 7.0% by mass, based on 100% by mass of the solids content of the emulsion composition for vibration damping materials.

Examples of the thickener include, for example, polyvinyl alcohol, cellulose derivatives, and polycarboxylic acid resins. The amount of the thickener is preferably 0.01 to 2 parts by mass, more preferably 0.05 to 1.5 parts by mass, and still more preferably 0.1 to 1 part by mass, in terms of solids content, based on 100 parts by mass of the solids content of the emulsion composition for vibration damping materials.

Preferred examples of the aqueous cross-linking agent include oxazoline compounds such as EPOCROS WS-500, WS-700, K-2010, 2020, 2030 (trade name, product of NIPPON SHOKUBAI CO., LTD.); epoxy compounds such as ADEKA resin EMN-26-60, EM-101-50 (trade name, product of ADEKA Corp.); melamine compounds such as CYMEL C-325 (trade name, product of Mitsui Cytec Ind.); block isocyanate compounds; zinc oxide compounds such as AZO-50 (trade name, 50% by mass of zinc oxide aqueous dispersant, product of NIPPON SHOKUBAI CO., LTD.).

The amount of the aqueous cross-linking agent is preferably 0.01 to 20 parts by mass, more preferably 0.15 to 15 parts by mass, and still more preferably 0.5 to 15 parts by mass, in terms of solids content, based on 100 parts by mass of the solids content of the emulsion composition for vibration damping materials.

The aqueous cross-linking agent may be added to the emulsion composition for vibration damping materials or may be added together with other component(s) when the thick-film coating composition for heat-drying is prepared. Addition of the cross-linking agent to the emulsion composition for vibration damping materials or the thick-film coating composition for heat-drying can improve toughness of the resin. Thereby, sufficiently high vibration damping property are exhibited in a high temperature range. In particular, an oxazoline compound is preferably used.

Examples of the filler include inorganic fillers such as calcium carbonate, kaolin, silica, talc, barium sulfate, alumina, iron oxide, titanium oxide, glass powder, magnesium carbonate, aluminum hydroxide, talc, diatomaceous earth, or clay; flaky inorganic fillers such as glass flakes or mica; and filamentous inorganic fillers such as metal oxide whiskers or glass fibers.

The amount of the filler is preferably 50 to 700 parts by mass and more preferably 100 to 550 parts by mass, based on 100 parts by mass of the solids content of the emulsion composition for vibration damping materials.

Examples of the gelling agent include starch and agar.

Examples of the dispersant include inorganic dispersants such as sodium hexametaphosphate or sodium tripolyphosphate, and organic dispersants such as polycarboxylic acid-based dispersants.

Examples of the defoaming agent include silicone defoaming agents.

Examples of the colorant include organic and inorganic colorants such as titanium oxide, carbon black, red iron oxide, Hansa yellow, benzine yellow, phthalocyanine blue, or quinacridone red.

Examples of the rustproof pigments include metal salts of phosphoric acid, molybdic acid, and boric acid.

Examples of the antiseptic agent include isothiazoline compounds.

In addition to the above other components, a polyvalent metal compound may be used. Such a polyvalent metal compound improves stability, dispersibility, and heat-drying property of the thick-film coating composition for heat-drying, and vibration damping property of the vibration damping material formed from the thick-film coating composition for heat-drying. Examples of the polyvalent metal compound include, but are not particularly limited to, zinc oxide, zinc chloride, and zinc sulfate. One or more of these may be used.

The polyvalent metal compound may be in the form of, for example, a powder, aqueous dispersion, or emulsified dispersion. In particular, the polyvalent metal compound is preferably used in the form of an aqueous dispersion or emulsified dispersion, and more preferably in the form of an emulsified dispersion because the dispersibility of the compound in the thick-film coating composition for heat-drying is improved.

The amount of the polyvalent metal compound is preferably 0.05 to 5.0 parts by mass and more preferably 0.05 to 3.5 parts by mass, based on 100 parts by mass of the solids content of the thick-film coating composition for heat-drying.

Another aspect of the present invention includes a vibration damping material obtained by applying the thick-film coating composition for heat-drying and drying the applied composition. The resulting coating has a thickness of preferably 1 to 5 mm.

In cases where the thick-film coating composition for heat-drying is a vibration damping coating composition including a foaming agent and the emulsion composition for vibration damping materials of the present invention which contains a (meth)acrylic polymer having a number average molecular weight of 25,000 or less, a coating formed from the vibration damping coating composition preferably has a thickness of 1.5 to 4.5 mm because the coating with such a thickness is excellent in vibration damping property and peel strength.

The thick-film coating composition for heat-drying can provide a coating as a vibration damping material, for example, by applying the composition to a base material and drying the applied composition. The thick-film coating composition for heat-drying can be applied to a base material by means of, for example, a brush, spatula, air spray, airless spray, mortar gun, or texture gun.

The application amount of the thick-film coating composition for heat-drying may be appropriately determined depending on the intended application, desired performance, or the like. For obtaining sufficient functionality such as vibration damping property, for example, the amount is preferably enough to form a coating with a thickness after drying of preferably not less than 1 mm, more preferably not less than 1.5 mm. Further, in view of the drying property of the coating, the coating after drying preferably has a thickness of not more than 5 mm and more preferably not more than 4.5 mm.

After the thick-film coating composition for heat-drying is applied, the applied composition may be dried by heating or at atmospheric temperature to form a coating. The thick-film coating composition for heat-drying of the present invention is excellent in heat-drying property. Therefore, in view of the efficiency, the thick-film coating composition for heat-drying is preferably dried by heating. The lower limit of the temperature of drying by heating is preferably 110° C. or higher and more preferably 120° C. or higher. The upper limit of the temperature of drying by heating is preferably 210° C. or lower and more preferably 170° C. or lower.

The vibration damping property of the thick-film coating composition for heat-drying, when used for vibration damping materials, can be evaluated by determining the loss coefficient of a coating formed from the thick-film coating composition for heat-drying.

The loss coefficient is usually represented by η, and represents the degree of attenuation of vibration applied to the vibration damping material. A higher loss coefficient indicates that the coating has higher vibration damping performance.

The loss coefficient is commonly determined by a resonance method in which a loss coefficient at around the resonant frequency is measured, and is specifically determined by a half-width method, attenuation factor method, or mechanical impedance method. Regarding the thick-film coating composition for heat-drying of the present invention, the loss coefficient of a coating formed from the thick-film coating composition for heat-drying is favorably measured by a resonance method (3 dB method) using a cantilever method. Measurement using a cantilever method can be performed by means of, for example, a FFT analyzer (CF-5200) produced by ONO SOKKI CO., LTD.

The loss coefficient is preferably measured by forming a film in such a way that the vibration damping coating composition in a volume of 200 mm in length×10 mm in width×3.0 mm in thickness is applied to a cold rolling steel plate (SPCC-SD: 250 mm in length×10 mm in width×1.6 mm in thickness), and dried at 95° C. for 30 minutes, and subsequently dry baked at 130° C. for 60 minutes. The loss coefficient is preferably measured at, for example, 20° C., 30° C., 40° C., 60° C., and optionally at 50° C. by a resonance method (3 dB method), and evaluation is performed based on the highest values of the resulting loss coefficients. Further, since the practical temperature range of the coating formed from the thick-film coating composition for heat-drying is usually 20° C. to 60° C., the vibration damping performance may be evaluated based on the total value of the loss coefficients measured at the above temperatures 20° C. to 60° C. The coating formed from the thick-film coating composition for heat-drying preferably has a total of loss coefficient at 20° C., 40° C., and 60° C. of preferably 0.120 or more and more preferably 0.200 or more. Such a thick-film coating composition for heat-drying can be evaluated to exhibit sufficient vibration damping property in the range of 20° C. to 60° C. which is the practical temperature range of the coating formed from the composition.

The thick-film coating composition for heat-drying of the present invention can provide a coating that exhibits excellent vibration damping property, and can be used for structures such as automobiles, railway vehicles, ships, aircrafts, electrical devices, buildings, or construction machinery. In particular, the composition is preferably used for bake coating of a steel plate for vehicles such as automobiles or railway vehicles. The preferred embodiments of the present invention include use of the thick-film coating composition for heat-drying of the present invention for bake coating of a steel plate for vehicles.

As described above, the thick-film coating composition for heat-drying of the present invention provides a coating having improved strength and adhesion to a base material, and such a coating is less likely to break or peel off. Therefore, the coating composition is favorably used particularly for members for vehicles (bake coating of steel plate for vehicles) which are likely to be subjected to vibration or impacts.

Advantageous Effects of Invention

The above-mentioned features of the emulsion composition for vibration damping materials of the present invention provide excellent vibration damping property and allow its use for vibration damping materials.

BRIEF DESCRIPTION OF DRAWINGS

FIG. 1 is a schematic view showing how to measure the peel strength in the examples.

DESCRIPTION OF EMBODIMENTS

The present invention is described in more detail with reference to Examples below, but the present invention is not limited to only these Examples. The terms, "part(s)" and "%" represent "part(s) by weight" and "% by weight", respectively, unless otherwise specified.

The physical characteristics and properties (the weight average molecular weight and glass transition temperature of polymers in polymer emulsions, the average particle size of emulsion particles, and the nonvolatile content, pH, and viscosity of emulsion compositions for vibration damping materials) were measured or calculated as described below in the examples and comparative examples.

<Weight Average Molecular Weight and Number Average Molecular Weight>

The weight average molecular weight and number average molecular weight were measured by gel permeation chromatography (GPC) under the following conditions.

Measuring equipment: HLC-8120GPC (trade name, product of Tosoh Corporation)

Molecular-weight column: TSK-GEL, GMHXL-L and TSK-GEL G5000HXL (all products of Tosoh Corporation) connected in series Eluent: tetrahydrofuran (THF)

Calibration curve reference material: polystyrene (product of Tosoh Corporation)

Measuring method: A measurement object was dissolved in THF to a solids content of about 0.2% by mass, and the resulting solution was filtered through a filter. The filtrate was measured for the molecular weights as a measurement sample.

<Glass Transition Temperature (Tg)>

The Tg was determined from the following formula (2) based on the monomer composition used in each stage.

[Formula 3]

$$\frac{1}{Tg'} = \left[\frac{W'_1}{T_1} + \frac{W'_2}{T_2} + \ldots + \frac{W'_n}{T_n}\right] \quad (2)$$

Tg values calculated from the monomer compositions in all the stages were expressed as "total Tg".

The following shows the glass transition temperature (Tg) values of homopolymers which were used to calculate the Tg values of the polymerizable monomer components from the formula (2).

Methyl methacrylate (MMA): 105° C.
Styrene (St): 100° C.
Butyl acrylate (BA): −56° C.
2-Ethylhexyl acrylate (2EHA): −70° C.
Acrylic acid (AA): 95° C.

<Average Particle Size>

The volume average particle size was measured by a dynamic light scattering method using a particle size distribution analyzer ("NICOMP Model 380" product of Particle Sizing Systems).

<Nonvolatile Content (N.V.)>

An about 1 g of an emulsion composition was weighed out, and dried in a hot air dryer at 110° C. for one hour. The residue amount after drying was measured as its nonvolatile content and expressed as % by mass relative to the mass before drying.

<pH>

The pH at 25° C. was measured using a pH meter ("F-23" product of HORIBA, Ltd.).

<Viscosity>

The viscosity was measured at under the conditions of 25° C. and 30 min⁻¹ using a B type rotary viscometer ("VISCOMETER TUB-10" product of Toki Sangyo Co., Ltd.).

COMPARATIVE EXAMPLE 1

A polymerization vessel equipped with a stirrer, a reflux condenser, a thermometer, a nitrogen inlet tube and a dropping funnel was charged with deionized water (285 parts). Then, the internal temperature was increased to 75° C. under stirring and nitrogen flow. The dropping funnel was charged with a monomer emulsion of the first step which was composed of styrene (180 parts), methyl methacrylate (180 parts), 2-ethylhexyl acrylate (130 parts), acrylic acid (10 parts), t-dodecyl mercaptan (3.0 parts), a previously adjusted 20% aqueous solution of HITENOL 18E (trade name, produced by Dai-ichi Kogyo Seiyaku Co., Ltd.) (75 parts) and deionized water (100 parts). While the internal temperature of the polymerization vessel was maintained at 80° C., a 50-part portion of the monomer emulsion, a 3% potassium persulfate aqueous solution (6.6 parts) and a 2% sodium hydrogen sulfite aqueous solution (5.0 parts) were added to initiate initial polymerization. After 20 minutes, the rest of the monomer emulsion was uniformly added dropwise over 120 minutes with the reaction system being maintained at 80° C. Simultaneously, a 3% potassium persulfate aqueous solution (80 parts) and a 2% sodium hydrogen sulfite aqueous solution (30 parts) were uniformly added dropwise over 120 minutes. After the completion of dropwise addition, the temperature was maintained for 60 minutes. The dropping funnel was then charged with a monomer emulsion of the second step which was composed of styrene (105 parts), methyl methacrylate (100 parts), 2-ethylhexyl acrylate (85 parts), butyl acrylate (200 parts), acrylic acid (10 parts), t-dodecyl mercaptan (4.0 parts), a previously adjusted 20% aqueous solution of HITENOL 18E (trade name, produced by Dai-ichi Kogyo Seiyaku Co., Ltd.) (75 parts) and deionized water (100 parts). The monomer emulsion was uniformly added dropwise into the reaction solution over 120 minutes. Simultaneously, a 3% potassium persulfate aqueous solution (80 parts) and a 2% sodium hydrogen sulfite aqueous solution (30 parts) were uniformly added dropwise over 120 minutes. After the completion of dropwise addition, the temperature was maintained for 90 minutes to complete the polymerization. The resulting reaction solution was cooled to room temperature, and 2-dimethylethanolamine (20 parts) and FINECIDE HS-10 (trade name, produced by Tokyo Fine Chemical CO., LTD., active component: 5%) (3 parts) were added. Thus, comparative emulsion composition 1 for vibration damping materials which had a nonvolatile content of 54.9%, a pH of 8.2, a viscosity of 410 mPa·s, a number average molecular weight of 16,000, and a molecular weight distribution of 3.0 was obtained. The polymer obtained in the first step had a Tg of 34° C., the polymer obtained in the second step had a Tg of −12° C., and the total Tg of these polymers of the first and second steps was 10° C.

COMPARATIVE EXAMPLE 2

Comparative emulsion composition 2 for vibration damping materials was prepared in the same manner as in Comparative Example 1, except that the monomer emulsion of the first step was composed of methyl methacrylate (300 parts), 2-ethylhexyl acrylate (75 parts), butyl acrylate (115 parts), acrylic acid (10 parts), t-dodecyl mercaptan (2.5 parts), a previously adjusted 20% aqueous solution of LATEMUL 118B (trade name, produced by Kao Corp.) (75 parts) and deionized water (100 parts), that the monomer emulsion of the second step was composed of methyl methacrylate (250 parts), 2-ethylhexyl acrylate (50 parts), butyl acrylate (190 parts), acrylic acid (10 parts), t-dodecyl mercaptan (2.5 parts), a previously adjusted 20% aqueous solution of LATEMUL 118B (trade name, produced by Kao Corp.) (75 parts) and deionized water (100 parts), and that the additive added instead of FINECIDE HS-10 (3 parts) to the reaction solution after cooling to room temperature was ROCIMA 553 (tradename, produced by Dow Chemical Co., active component: 12%) (1.5 parts). The emulsion composition had a nonvolatile content of 55%, a pH of 8.1, a viscosity of 500 mPa·s, a number average molecular weight of 24,000, and a molecular weight distribution of 2.1. The polymer obtained in the first step had a Tg of 18° C., the polymer obtained in the second step had a Tg of 3° C., and the total Tg of these polymers of the first and second steps was 10° C.

COMPARATIVE EXAMPLE 3

Comparative emulsion composition 3 for vibration damping materials was prepared in the same manner as in Comparative Example 1, except that the monomer emulsion of the first step was composed of 2-ethylhexyl acrylate (50 parts), butyl acrylate (90 parts), styrene (250 parts), acrylic acid (10 parts), t-dodecyl mercaptan (3.0 parts), a previously adjusted 20% aqueous solution of LATEMUL WX (trade name, produced by Kao Corp.) (60 parts) and deionized water (80 parts), that the sodium hydrogen sulfite aqueous solutions used after the initial polymerization were changed to 2.3% sodium hydrogen sulfite aqueous solutions, that the amount of the 3% potassium persulfate aqueous solution added dropwise together with the monomer emulsion was 64 parts, that the amount of the 2.3% sodium hydrogen sulfite aqueous solution used after the initial polymerization was 24 parts, that the monomer emulsion of the second step was composed of 2-ethylhexyl acrylate (290 parts), styrene (300 parts), acrylic acid (10 parts), t-dodecyl mercaptan (3.0 parts), a previously adjusted 20% aqueous solution of LATEMUL WX (trade name, produced by Kao Corp.) (90 parts) and deionized water (120 parts), that the amounts of the 3% potassium persulfate aqueous solution and the 2.3% sodium hydrogen sulfite aqueous solution simultaneously added dropwise were 96 parts and 36 parts, respectively, and that the additive added instead of FINECIDE HS-10 (3 parts) to the reaction solution after cooling to room temperature was PROXEL GXL (trade name, produced by Lonza, active component: 20%) (0.5 parts). The emulsion composition had a nonvolatile content of 54.6%, a pH of 8.0, a viscosity of 290 mPa·s, a number average molecular weight of 20,000, and a molecular weight distribution of 2.0. The polymer obtained in the first step had a Tg of 21° C., the polymer obtained in the second step had a Tg of −8° C., and the total Tg of these polymers of the first and second steps was 3° C.

COMPARATIVE EXAMPLE 4

Comparative emulsion composition 4 for vibration damping materials was prepared in the same manner as in Comparative Example 1, except that the monomer emulsion of the first step was composed of 2-ethylhexyl acrylate (75 parts), methyl methacrylate (300 parts), butyl acrylate (115 parts), acrylic acid (10 parts), t-dodecyl mercaptan (4.5 parts), a previously adjusted 20% aqueous solution of LATEMUL 118B and EMULGEN 1118S (trade names, both produced by Kao Corp., mass ratio between them: 1:1) (75 parts) and deionized water (100 parts), that the monomer emulsion of the second step was composed of 2-ethylhexyl acrylate (50 parts), methyl methacrylate (250 parts), butyl acrylate (190 parts), acrylic acid (10 parts), t-dodecyl mercaptan (4.5 parts), a previously adjusted 20% aqueous solution of LATEMUL 118B and EMULGEN 1118S (trade names, both produced by Kao Corp., mass ratio between them: 1:1) (75 parts) and deionized water (100 parts), and that the additives added instead of 2-dimethylethanolamine and FINECIDE HS-10 (3 parts) to the reaction solution after cooling to room temperature were triethylamine (22 parts) and PROXEL NBZ (trade name, produced by Lonza, active component: 10%) (1.0 part), respectively. The emulsion composition had a nonvolatile content of 55%, a pH of 8.0, a viscosity of 240 mPa·s, a number average molecular weight of 13,000, and a molecular weight distribution of 2.9. The polymer obtained in the first step had a Tg of 18° C., the polymer obtained in the second step had a Tg of 3° C., and the total Tg of these polymers of the first and second steps was 10° C.

COMPARATIVE EXAMPLE 5

A polymerization vessel equipped with a stirrer, a reflux condenser, a thermometer, a nitrogen inlet tube and a dropping funnel was charged with deionized water (285 parts). Then, the internal temperature was increased to 75° C. under stirring and nitrogen flow. The dropping funnel was charged with a monomer emulsion which was composed of styrene (285 parts), methyl methacrylate (280 parts), 2-ethylhexyl acrylate (215 parts), butyl acrylate (200 parts), acrylic acid (20 parts), t-dodecyl mercaptan (6 parts), a previously adjusted 20% aqueous solution of HITENOL 18E (trade name, produced by Dai-ichi Kogyo Seiyaku Co., Ltd.) (150 parts) and deionized water (200 parts). While the internal temperature of the polymerization vessel was maintained at 80° C., a 100-part portion of the monomer emulsion, a 3% potassium persulfate aqueous solution (6.6 parts) and a 7.5% sodium hydrogen sulfite aqueous solution (6.6 parts) were added to initiate initial polymerization. After 20 minutes, the rest of the monomer emulsion was uniformly added dropwise over 240 minutes with the reaction system being maintained at 80° C. Simultaneously, a 3% potassium persulfate aqueous solution (160 parts) and a 7.5% sodium hydrogen sulfite aqueous solution (60 parts) were uniformly added dropwise over 240 minutes. After the completion of dropwise addition, the temperature was maintained for 90 minutes to complete the polymerization. The resulting reaction solution was cooled to room temperature, and triethylamine (22 parts) and FINECIDE HS-10 (trade name, produced by Tokyo Fine Chemical CO., LTD., active component: 5%) (3 parts) were added. Thus, comparative emulsion composition 5 for vibration damping materials which had a nonvolatile content of 54%, a pH of 8.3, a viscosity of 320 mPa·s, a number average molecular weight of 31,000, and a molecular weight distribution of 2.3 was obtained. The polymer had a Tg of 10° C.

COMPARATIVE EXAMPLE 6

Comparative emulsion composition 6 for vibration damping materials was prepared in the same manner as in Comparative Example 5, except that the amount of t-dodecyl mercaptan was changed to 0.1 parts, that the 7.5% sodium hydrogen sulfite aqueous solution was changed to a 2.0% sodium hydrogen sulfite aqueous solution, and that the triethylamine (22 parts) was changed to 2-dimethylethanolamine (20 parts). The emulsion composition had a nonvolatile content of 54.6%, a pH of 7.8, a viscosity of 350 mPa·s, a number average molecular weight of 79,000, and a molecular weight distribution of 3.0.

COMPARATIVE EXAMPLE 7

Comparative emulsion composition 7 for vibration damping materials was prepared in the same manner as in Comparative Example 1, except that the 2% sodium hydrogen sulfite aqueous solution was not used neither in the initial reaction nor in the dropwise addition, and that the 2-dimethylethanolamine (20 parts) was changed to monoethanolamine (14 parts). The emulsion composition had a nonvolatile content of 56.5%, a pH of 8.3, a viscosity of 1200 mPa·s, a number average molecular weight of 34,000, and a molecular weight distribution of 2.4.

COMPARATIVE EXAMPLE 8

Comparative emulsion composition 8 for vibration damping materials was prepared in the same manner as in Comparative Example 6, except that the 2-dimethylethanolamine (20 parts) was changed to ammonia (10 parts), and that FINECIDE HS-10 was not used. The emulsion composition had a nonvolatile content of 55.1%, a pH of 8.0, a viscosity of 400 mPa·s, a number average molecular weight of 77,000, and a molecular weight distribution of 3.1.

COMPARATIVE EXAMPLE 9

Comparative emulsion composition 9 for vibration damping materials was prepared in the same manner as in Comparative Example 6, except that the 2-dimethylethanolamine (20 parts) was changed to ammonia (10 parts), and that formalin (0.5 parts) was used instead of FINECIDE HS-10 (3 parts). The emulsion composition had a nonvolatile content of 55.0%, a pH of 7.7, a viscosity of 350 mPa·s, a number average molecular weight of 78,000, and a molecular weight distribution of 3.1.

COMPARATIVE EXAMPLE 10

Comparative emulsion composition 10 for vibration damping materials was prepared in the same manner as in Comparative Example 1, except that the amount of t-dodecyl mercaptan used in the first step was 2.0 parts, that the sodium hydrogen sulfite aqueous solution used after the initial polymerization were changed to a 7.5% sodium hydrogen sulfite aqueous solution, that a 100-part portion of the monomer emulsion of the first step was added at the beginning of the initial polymerization, that the amount of t-dodecyl mercaptan used in the second step was 1.0 part, that the 2% sodium hydrogen sulfite aqueous solution used in the second step was changed to a 7.5% sodium hydrogen sulfite aqueous solution, that PROXEL GXL (0.25 parts) and FINECIDE HS-10 (1 part) were used instead of FINECIDE HS-10 (3 parts), and that diglycolamine (22 parts) was used instead of 2-dimethylethanolamine. The emulsion composition had a nonvolatile content of 54.7%, a pH of 7.8, a viscosity of 150 mPa·s, a number average molecular weight of 35,000, and a molecular weight distribution of 2.9. The polymer obtained in the first step had a Tg of 34° C., the polymer obtained in the second step had a Tg of −12° C., and the total Tg of these polymers of the first and second steps was 10° C.

COMPARATIVE EXAMPLE 11

Comparative emulsion composition 11 for vibration damping materials was prepared in the same manner as in Comparative Example 1, except that t-dodecyl mercaptan was not used in the first step, that a 100-part portion of the monomer emulsion of the first step was added at the beginning of the initial polymerization, that the amount of t-dodecyl mercaptan used in the second step was 0.1 parts, and that PROXEL GXL (0.25 parts) and FINECIDE HS-10 (1 part) were used instead of FINECIDE HS-10 (3 parts). The emulsion composition had a nonvolatile content of 54.6%, a pH of 7.8, a viscosity of 350 mPa·s, a number average molecular weight of 81,000, and a molecular weight distribution of 3.0. The polymer obtained in the first step had a Tg of 34° C., the polymer obtained in the second step had a Tg of −12° C., and the total Tg of these polymers of the first and second steps was 10° C.

COMPARATIVE EXAMPLE 12

Comparative emulsion composition 12 for vibration damping materials was prepared in the same manner as in Comparative Example 1, except that the amount of water charged in the polymerization vessel was 435 parts, that the 2% sodium hydrogen sulfite aqueous solution was not used neither in the initial reaction nor in the dropwise addition, that the amounts of 3% potassium persulfate used in the initial reaction, in the dropwise addition in the first step, and in the dropwise addition in the second step were 1.6 parts, 35 parts, and 35 parts, respectively, that 2.5 parts of t-dodecyl mercaptan was added dropwise both in the first and second steps, that a 100-part portion of the monomer emulsion of the first step was added at the beginning of the initial polymerization, and that monoethanolamine (14 parts) was used instead of 2-dimethylethanolamine. The emulsion composition had a nonvolatile content of 54.5%, a pH of 8.3, a viscosity of 350 mPa·s, a number average molecular weight of 29,000, and a molecular weight distribution of 2.8. The polymer obtained in the first step had a Tg of 34° C., the polymer obtained in the second step had a Tg of −12° C., and the total Tg of these polymers of the first and second steps was 10° C.

COMPARATIVE EXAMPLE 13

Comparative emulsion composition 13 for vibration damping materials was prepared in the same manner as in Comparative Example 1, except that the monomer emulsion of the first step was composed of methyl methacrylate (300 parts), 2-ethylhexyl acrylate (75 parts), butyl acrylate (115 parts), acrylic acid (10 parts), t-dodecyl mercaptan (1.0 part), a previously adjusted 20% aqueous solution of LATEMUL 118B (trade name, produced by Kao Corp.) (75 parts) and deionized water (100 parts), that a 100-part portion of the monomer emulsion of the first step was added at the beginning of the initial polymerization, that the monomer emulsion of the second step was composed of methyl methacrylate (250 parts), 2-ethylhexyl acrylate (50 parts), butyl acrylate (190 parts), acrylic acid (10 parts), t-dodecyl mercaptan (1.0 part), a previously adjusted 20% aqueous solution of LATEMUL 118B (trade name, produced by Kao Corp.) (75 parts) and deionized water (100 parts), and that the additive added instead of FINECIDE HS-10 (3 parts) to the reaction solution after cooling to room temperature was ROCIMA 553 (trade name, produced by Dow Chemical Co., active component: 12%) (1.5 parts). The emulsion composition had a nonvolatile content of 54.9%, a pH of 8.0, a viscosity of 440 mPa·s, a number average molecular weight of 45,000, and a molecular weight distribution of 3.1. The polymer obtained in the first step had a Tg of 18° C., the polymer obtained in the second step had a Tg of 3° C., and the total Tg of these polymers of the first and second steps was 10° C.

EXAMPLE 1

A polymerization vessel equipped with a stirrer, a reflux condenser, a thermometer, a nitrogen inlet tube and a dropping funnel was charged with deionized water (285 parts). Then, the internal temperature was increased to 75° C. under stirring and nitrogen flow. The dropping funnel was charged with a monomer emulsion of the first step which was composed of styrene (180 parts), methyl methacrylate (180 parts), 2-ethylhexyl acrylate (130 parts), acrylic acid (10 parts), t-dodecyl mercaptan (3.0 parts), a previously adjusted 20% aqueous solution of HITENOL 18E (trade name, produced by Dai-ichi Kogyo Seiyaku Co., Ltd.) (75 parts) and deionized water (100 parts). While the internal temperature of the polymerization vessel was maintained at 80° C., a 50-part portion of the monomer emulsion, a 3% potassium persulfate aqueous solution (6.6 parts) and a 2% sodium hydrogen sulfite aqueous solution (5.0 parts) were added to initiate initial polymerization. After 20 minutes, the rest of the monomer emulsion was uniformly added dropwise over 120 minutes with the reaction system being maintained at 80° C. Simultaneously, a 3% potassium persulfate aqueous solution (80 parts) and a 2% sodium hydrogen sulfite aqueous solution (30 parts) were uniformly added dropwise over 120 minutes. After the completion of dropwise addition, the temperature was maintained for 60 minutes. The dropping funnel was then charged with a monomer emulsion of the second step which was composed of styrene (105 parts), methyl methacrylate (100 parts), 2-ethylhexyl acrylate (85 parts), butyl acrylate (200 parts), acrylic acid (10 parts), t-dodecyl mercaptan (4.0 parts), a previously adjusted 20% aqueous solution of HITENOL 18E (trade name, produced by Dai-ichi Kogyo Seiyaku Co., Ltd.) (75 parts) and deionized water (100 parts), and the emulsion was uniformly added dropwise over 120 minutes. Simultaneously, a 3% potassium persulfate aqueous solution (80 parts) and a 2% sodium hydrogen sulfite aqueous solution (30 parts) were uniformly added dropwise over 120 minutes. After the completion of dropwise addition, the temperature was maintained for 90 minutes to complete the polymerization. The resulting reaction solution was cooled to room temperature, and 2-dimethylethanolamine (20 parts), propylene glycol diacetate (21 parts), and FINECIDE HS-10 (trade name, produced by Tokyo Fine Chemical CO., LTD., active component: 5%) (3 parts) were added. Thus, emulsion composition 1 for vibration damping materials which had a nonvolatile content of 54.8%, a pH of 8.2, a viscosity of 410 mPa·s, a number average molecular weight of 17,000, and a molecular weight distribution of 2.9 was prepared. The polymer obtained in the first step had a Tg of 34° C., the polymer obtained in the second step had a Tg of –12° C., and the total Tg of these polymers of the first and second steps was 10° C.

EXAMPLE 2

Emulsion composition 2 for vibration damping materials was prepared in the same manner as in Example 1, except that the monomer emulsion of the first step was composed of 2-ethylhexyl acrylate (50 parts), styrene (250 parts), butyl acrylate (90 parts), acrylic acid (10 parts), t-dodecyl mercaptan (3.0 parts), a previously adjusted 20% aqueous solution of LATEMUL WX (trade name, produced by Kao Corp.) (60 parts) and deionized water (80 parts), that 64 parts of the 3% potassium persulfate aqueous solution and 24 parts of a 2.3% sodium hydrogen sulfite aqueous solution were simultaneously added dropwise, that the monomer emulsion of the second step was composed of 2-ethylhexyl acrylate (290 parts), styrene (300 parts), acrylic acid (10 parts), t-dodecyl mercaptan (3.0 parts), a previously adjusted 20% aqueous solution of LATEMUL WX (trade name, produced by Kao Corp.) (90 parts) and deionized water (120 parts), that 96 parts of the 3% potassium persulfate aqueous solution and 36 parts of a 2.3% sodium hydrogen sulfite aqueous solution were simultaneously added, and that the additives added instead of propylene glycol diacetate (21 parts) and FINECIDE HS-10 (3 parts) to the reaction solution after cooling to room temperature were dipropylene glycol monopropyl ether (21 parts) and PROXEL GXL (trade name, produced by Lonza, active component 20%) (0.5 parts). The emulsion composition had a nonvolatile content of 54.5%, a pH of 8.1, a viscosity of 500 mPa·s, a number average molecular weight of 20,000, and a molecular weight distribution of 2.1. The polymer obtained in the first step had a Tg of 22° C., the polymer obtained in the second step had a Tg of –8° C., and the total Tg of these polymers of the first and second steps was 3° C.

EXAMPLE 3

Emulsion composition 3 for vibration damping materials was prepared in the same manner as in Example 1, except that diisodecyl phthalate (21 parts) was used instead of propylene glycol diacetate (21 parts). The emulsion composition had a nonvolatile content of 55.4%, a pH of 8.2, a viscosity of 410 mPa·s, a number average molecular weight of 16,000, and a molecular weight distribution of 3.2. The polymer obtained in the first step had a Tg of 34° C., the polymer obtained in the second step had a Tg of –12° C., and the total Tg of these polymers of the first and second steps was 10° C.

EXAMPLE 4

Emulsion composition 4 for vibration damping materials was prepared in the same manner as in Example 2, except that diisononyl phthalate (10 parts) and dipropylene glycol monopropyl ether (10 parts) were used instead of dipropylene glycol monopropyl ether (21 parts). The emulsion composition had a nonvolatile content of 54.9%, a pH of 8.0, a viscosity of 290 mPa·s, a number average molecular weight of 18,000, and a molecular weight distribution of 2.2. The polymer obtained in the first step had a Tg of 22° C., the polymer obtained in the second step had a Tg of –8° C., and the total Tg of these polymers of the first and second steps was 3° C.

EXAMPLE 5

Emulsion composition 5 for vibration damping materials was prepared in the same manner as in Example 1, except that FINECIDE HS-10 was not used, and that dipropylene glycol monobutyl ether (21 parts) was used instead of propylene glycol diacetate (21 parts). The emulsion composition had a nonvolatile content of 54.6%, a pH of 8.1, a viscosity of 360 mPa·s, a number average molecular weight of 20,000, and a molecular weight distribution of 2.5. The polymer obtained in the first step had a Tg of 34° C., the polymer obtained in the second step had a Tg of –12° C., and the total Tg of these polymers of the first and second steps was 10° C.

EXAMPLE 6

Emulsion composition 6 for vibration damping materials was prepared in the same manner as in Example 2, except that PROXEL GXL was not used, and that dipropylene glycol methyl ether acetate (21 parts) was used instead of dipropylene glycol monopropyl ether (21 parts). The emulsion composition had a nonvolatile content of 54.6%, a pH of 8.0, a viscosity of 280 mPa·s, a number average molecular weight of 18,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 7

Emulsion composition 7 for vibration damping materials was prepared in the same manner as in Example 2, except that PROXEL GXL was not used, and that propylene glycol diacetate (21 parts) was used instead of dipropylene glycol monopropyl ether (21 parts). The emulsion composition had a nonvolatile content of 54.3%, a pH of 8.0, a viscosity of 280 mPa·s, a number average molecular weight of 18,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 8

Emulsion composition 8 for vibration damping materials was prepared in the same manner as in Example 2, except that PROXEL GXL was not used. The emulsion composition had a nonvolatile content of 54.5%, a pH of 8.0, a viscosity of 280 mPa·s, a number average molecular weight of 19,000, and a molecular weight distribution of 2.1. The polymer obtained in the first step had a Tg of 22° C., the polymer obtained in the second step had a Tg of −8° C., and the total Tg of these polymers of the first and second steps was 3° C.

EXAMPLE 9

Emulsion composition 9 for vibration damping materials was prepared in the same manner as in Example 2, except that PROXEL GXL was not used, and that dipropylene glycol monobutyl ether (21 parts) was used instead of dipropylene glycol monopropyl ether (21 parts). The emulsion composition had a nonvolatile content of 54.5%, a pH of 8.0, a viscosity of 280 mPa·s, a number average molecular weight of 19,000, and a molecular weight distribution of 2.1. The polymer obtained in the first step had a Tg of 22° C., the polymer obtained in the second step had a Tg of −8° C., and the total Tg of these polymers of the first and second steps was 3° C.

EXAMPLE 10

Emulsion composition 10 for vibration damping materials was prepared in the same manner as in Example 2, except that PROXEL GXL was not used, and that dipropylene glycol methyl ether acetate (90 parts) was used instead of dipropylene glycol monopropyl ether (21 parts). The emulsion composition had a nonvolatile content of 54.6%, a pH of 8.0, a viscosity of 230 mPa·s, a number average molecular weight of 20,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 11

Emulsion composition 11 for vibration damping materials was prepared in the same manner as in Example 2, except that PROXEL GXL was not used, and that propylene glycol diacetate (11 parts) was used instead of dipropylene glycol monopropyl ether (21 parts). The emulsion composition had a nonvolatile content of 54.5%, a pH of 8.0, a viscosity of 290 mPa·s, a number average molecular weight of 19,000, and a molecular weight distribution of 2.1. The polymer obtained in the first step had a Tg of 22° C., the polymer obtained in the second step had a Tg of −8° C., and the total Tg of these polymers of the first and second steps was 3° C.

COMPARATIVE EXAMPLE 14

Comparative emulsion composition 14 for vibration damping materials was prepared in the same manner as in Example 2, except that PROXEL GXL was not used, and that diethylene glycol monoethyl ether (21 parts) was used instead of dipropylene glycol monopropyl ether (21 parts). The emulsion composition had a nonvolatile content of 54.5%, a pH of 8.0, a viscosity of 280 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

COMPARATIVE EXAMPLE 15

Comparative emulsion composition 15 for vibration damping materials was prepared in the same manner as in Example 2, except that PROXEL GXL was not used, and that ethylene glycol mono-n-butyl ether (21 parts) was used instead of dipropylene glycol monopropyl ether (21 parts). The emulsion composition had a nonvolatile content of 54.4%, a pH of 8.1, a viscosity of 290 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

COMPARATIVE EXAMPLE 16

Comparative emulsion composition 16 for vibration damping materials was prepared in the same manner as in Example 2, except that PROXEL GXL was not used, and that ethylene glycol monobutyl ether acetate (21 parts) was used instead of dipropylene glycol monopropyl ether (21 parts). The emulsion composition had a nonvolatile content of 54.4%, a pH of 8.0, a viscosity of 290 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 12

Emulsion composition 12 for vibration damping materials was prepared in the same manner as in Example 1, except that FINECIDE HS-10 was not used, and that diisodecyl phthalate (21 parts) was used instead of propylene glycol diacetate (21 parts). The emulsion composition had a nonvolatile content of 55.4%, a pH of 8.1, a viscosity of 430 mPa·s, a number average molecular weight of 17,000, and a molecular weight distribution of 2.8. The polymer obtained in the first step had a Tg of 34° C., the polymer obtained in the second step had a Tg of −12° C., and the total Tg of these polymers of the first and second steps was 10° C.

EXAMPLE 13

Emulsion composition 13 for vibration damping materials was prepared in the same manner as in Example 2, except that PROXEL GXL was not used, and that diisodecyl phthalate (21 parts) was used instead of dipropylene glycol monopropyl ether (21 parts). The emulsion composition had a nonvolatile content of 55.1%, a pH of 8.0, a viscosity of 290 mPa·s, a number average molecular weight of 18,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 14

Emulsion composition 14 for vibration damping materials was prepared in the same manner as in Example 2, except that PROXEL GXL was not used, and that diisononyl phthalate (21 parts) was used instead of dipropylene glycol monopropyl ether (21 parts). The emulsion composition had a nonvolatile content of 55.1%, a pH of 8.0, a viscosity of 290 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 15

Emulsion composition 15 for vibration damping materials was prepared in the same manner as in Example 2, except that PROXEL GXL was not used, and that dioctyl adipate (21 parts) was used instead of dipropylene glycol monopropyl ether (21 parts). The emulsion composition had a nonvolatile content of 55.1%, a pH of 8.0, a viscosity of 2760 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 16

Emulsion composition 16 for vibration damping materials was prepared in the same manner as in Example 2, except that PROXEL GXL was not used, and that diisononyl phthalate (10 parts) and dipropylene glycol monopropyl ether (10 parts) were used instead of dipropylene glycol monopropyl ether (21 parts). The emulsion composition had a nonvolatile content of 55.0%, a pH of 8.0, a viscosity of 290 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

COMPARATIVE EXAMPLE 17

Comparative emulsion composition 17 for vibration damping materials was prepared in the same manner as in Example 2, except that PROXEL GXL was not used, and that dimethyl fumarate (21 parts) was used instead of dipropylene glycol monopropyl ether (21 parts). The emulsion composition had a nonvolatile content of 55.1%, a pH of 8.0, a viscosity of 590 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 17

Emulsion composition 17 for vibration damping materials was prepared in the same manner as in Example 2, except that PROXEL GXL was not used, and that diisononyl adipate (21 parts) was used instead of dipropylene glycol monopropyl ether (21 parts). The emulsion composition had a nonvolatile content of 55.1%, a pH of 8.1, a viscosity of 640 mPa·s, a number average molecular weight of 19,000, and a molecular weight distribution of 2.2. The polymer obtained in the first step had a Tg of 22° C., the polymer obtained in the second step had a Tg of −8° C., and the total Tg of these polymers of the first and second steps was 3° C.

EXAMPLE 18

Emulsion composition 18 for vibration damping materials was prepared in the same manner as in Example 2, except that PROXEL GXL was not used, and that diisononyl phthalate (130 parts) was used instead of dipropylene glycol monopropyl ether (21 parts). The emulsion composition had a nonvolatile content of 57.6%, a pH of 8.0, a viscosity of 560 mPa·s, a number average molecular weight of 18,000, and a molecular weight distribution of 2.3. The polymer obtained in the first step had a Tg of 22° C., the polymer obtained in the second step had a Tg of −8° C., and the total Tg of these polymers of the first and second steps was 3° C.

EXAMPLE 19

Emulsion composition 19 for vibration damping materials was prepared in the same manner as in Example 1, except that diisononyl phthalate (10 parts) and dipropylene glycol monopropyl ether (10 parts) were used instead of propylene glycol diacetate (21 parts). The emulsion composition had a nonvolatile content of 55.1%, a pH of 8.2, a viscosity of 410 mPa·s, a number average molecular weight of 17,000, and a molecular weight distribution of 2.9. The polymer obtained in the first step had a Tg of 34° C., the polymer obtained in the second step had a Tg of −12° C., and the total Tg of these polymers of the first and second steps was 10° C.

EXAMPLE 20

Emulsion composition 20 for vibration damping materials was prepared in the same manner as in Example 1, except that a 100-part portion of the monomer emulsion of the first step was added at the beginning of the initial polymerization, and that the monomer emulsion of the first step was free from t-dodecyl mercaptan, and that the amount of t-dodecyl mercaptan in the monomer emulsion of the second step was changed from 4.0 parts to 0.1 parts. The emulsion composition had a nonvolatile content of 54.5%, a pH of 7.8, a viscosity of 340 mPa·s, a number average molecular weight of 84,000, and a molecular weight distribution of 3.0. The polymer obtained in the first step had a Tg of 34° C., the polymer obtained in the second step had a Tg of −12° C., and the total Tg of these polymers of the first and second steps was 10° C.

EXAMPLE 21

Emulsion composition 21 for vibration damping materials was prepared in the same manner as in Example 1, except that a 100-part portion of the monomer emulsion of the first step was added at the beginning of the initial polymerization, that the monomer emulsion of the first step was free from t-dodecyl mercaptan, and the amount of t-dodecyl mercaptan in the monomer emulsion of the second step was changed from 4.0 parts to 0.1 parts, and that dipropylene glycol monobutyl ether (21 parts) was used instead of propylene glycol diacetate (21 parts). The emulsion composition had a nonvolatile content of 54.6%, a pH of 7.8, a viscosity of 350 mPa·s, a number average molecular weight of 83,000, and a molecular weight distribution of 3.0. The polymer obtained in the first step had a Tg of 34° C., the polymer obtained in the second step had a Tg of −12° C., and the total Tg of these polymers of the first and second steps was 10° C.

EXAMPLE 22

A polymerization vessel equipped with a stirrer, a reflux condenser, a thermometer, a nitrogen inlet tube and a dropping funnel was charged with deionized water (285 parts). Then, the internal temperature was increased to 75° C. under stirring and nitrogen flow. The dropping funnel was charged with a monomer emulsion of the first step which was composed of methyl methacrylate (300 parts), 2-ethylhexyl acrylate (75 parts), butyl acrylate (115 parts), acrylic acid (10 parts), t-dodecyl mercaptan (1.0 part), a previously adjusted 20% aqueous solution of LATEMUL 118B (trade name, produced by Kao Corp.) (75 parts) and deionized water (100 parts). While the internal temperature of the polymerization vessel was maintained at 80° C., a 100-part portion of the monomer emulsion, a 3% potassium persulfate aqueous solution (6.6 parts) and a 2% sodium hydrogen sulfite aqueous solution (5.0 parts) were added to initiate initial polymerization. After 20 minutes, the rest of the monomer emulsion was uniformly added dropwise over 120 minutes with the reaction system being maintained at 80° C. Simultaneously, a 3% potassium persulfate aqueous solution (80 parts) and a 2% sodium hydrogen sulfite aqueous solution (30 parts) were uniformly added dropwise over 120 minutes. After the completion of dropwise addition, the temperature was maintained for 60 minutes. The dropping funnel was charged with a monomer emulsion of the second step which was composed of methyl methacrylate (250 parts), 2-ethylhexyl acrylate (50 parts), butyl acrylate (190 parts), acrylic acid (10 parts), t-dodecyl mercaptan (1.0 part), a previously adjusted 20% aqueous solution of LATEMUL 118B (trade name, produced by Kao Corp.) (75 parts) and deionized water (100 parts), and the emulsion was uniformly added dropwise over 120 minutes. Simultaneously, a 3% potassium persulfate aqueous solution (80 parts) and a 2% sodium hydrogen sulfite aqueous solution (30 parts) were uniformly added dropwise over 120 minutes. After the completion of dropwise addition, the temperature was maintained for 90 minutes to complete the polymerization. The resulting reaction solution was cooled to room temperature, and 2-dimethylethanolamine (20 parts), dipropylene glycol methyl ether acetate (21 parts), and ROCIMA 553 (trade name, produced by Dow Chemical Co., active component 12%) (1.5 parts) were added. Thus, emulsion composition 22 for vibration damping materials which had a nonvolatile content of 54.9%, a pH of 8.0, a viscosity of 430 mPa·s, a number average molecular weight of 42,000, and a molecular weight distribution of 3.0 was obtained. The polymer obtained in the first step had a Tg of 18° C., the polymer obtained in the second step had a Tg of 3° C., and the total Tg of these polymers of the first and second steps was 10° C.

EXAMPLE 23

Emulsion composition 23 for vibration damping materials was prepared in the same manner as in Example 22, except that propylene glycol diacetate (21 parts) was used instead of dipropylene glycol methyl ether acetate (21 parts). The emulsion composition had a nonvolatile content of 54.7%, a pH of 8.0, a viscosity of 430 mPa·s, a number average molecular weight of 44,000, and a molecular weight distribution of 3.1. The polymer obtained in the first step had a Tg of 18° C., the polymer obtained in the second step had a Tg of 3° C., and the total Tg of these polymers of the first and second steps was 10° C.

EXAMPLE 24

Emulsion composition 24 for vibration damping materials was prepared in the same manner as in Example 22, except that dipropylene glycol monopropyl ether (21 parts) was used instead of dipropylene glycol methyl ether acetate (21 parts). The emulsion composition had a nonvolatile content of 54.8%, a pH of 8.0, a viscosity of 420 mPa·s, a number average molecular weight of 46,000, and a molecular weight distribution of 3.2. The polymer obtained in the first step had a Tg of 18° C., the polymer obtained in the second step had a Tg of 3° C., and the total Tg of these polymers of the first and second steps was 10° C.

EXAMPLE 25

Emulsion composition 25 for vibration damping materials was prepared in the same manner as in Example 22, except that the amount of dipropylene glycol methyl ether acetate was increased from 21 parts to 90 parts. The emulsion composition had a nonvolatile content of 54.9%, a pH of 8.0, a viscosity of 400 mPa·s, a number average molecular weight of 46,000, and a molecular weight distribution of 3.2. The polymer obtained in the first step had a Tg of 18° C., the polymer obtained in the second step had a Tg of 3° C., and the total Tg of these polymers of the first and second steps was 10° C.

EXAMPLE 26

Emulsion composition 26 for vibration damping materials was prepared in the same manner as in Example 22, except that propylene glycol diacetate (11 parts) was used instead of dipropylene glycol methyl ether acetate (21 parts). The emulsion composition had a nonvolatile content of 54.8%, a pH of 8.0, a viscosity of 440 mPa·s, a number average molecular weight of 49,000, and a molecular weight distribution of 3.1. The polymer obtained in the first step had a Tg of 18° C., the polymer obtained in the second step had a Tg of 3° C., and the total Tg of these polymers of the first and second steps was 10° C.

COMPARATIVE EXAMPLE 18

Comparative emulsion composition 18 for vibration damping materials was prepared in the same manner as in Example 22, except that diethylene glycol monoethyl ether (21 parts) was used instead of dipropylene glycol methyl ether acetate (21 parts). The emulsion composition had a nonvolatile content of 54.3%, a pH of 8.0, a viscosity of 390 mPa·s, a number average molecular weight of 47,000, and a molecular weight distribution of 3.0. The polymer obtained in the first step had a Tg of 18° C., the polymer obtained in the second step had a Tg of 3° C., and the total Tg of these polymers of the first and second steps was 10° C.

COMPARATIVE EXAMPLE 19

Comparative emulsion composition 19 for vibration damping materials was prepared in the same manner as in Example 22, except that ethylene glycol mono-n-butyl ether (21 parts) was used instead of dipropylene glycol methyl ether acetate (21 parts). The emulsion composition had a nonvolatile content of 54.7%, a pH of 8.1, a viscosity of 420 mPa·s, a number average molecular weight of 44,000, and a molecular weight distribution of 3.2. The polymer obtained in the first step had a Tg of 18° C., the polymer obtained in the second step had a Tg of 3° C., and the total Tg of these polymers of the first and second steps was 10° C.

COMPARATIVE EXAMPLE 20

Comparative emulsion composition 20 for vibration damping materials was prepared in the same manner as in Example 22, except that ethylene glycol monobutyl ether acetate (21 parts) was used instead of dipropylene glycol methyl ether acetate (21 parts). The emulsion composition had a nonvolatile content of 54.6%, a pH of 8.0, a viscosity of 400 mPa·s, a number average molecular weight of 46,000, and a molecular weight distribution of 3.1. The polymer obtained in the first step had a Tg of 18° C., the polymer obtained in the second step had a Tg of 3° C., and the total Tg of these polymers of the first and second steps was 10° C.

EXAMPLE 27

Emulsion composition 27 for vibration damping materials was prepared in the same manner as in Example 1, except that t-dodecyl mercaptan was not used in the first step, that the amount of t-dodecyl mercaptan used in the second step was changed to 0.1 parts, and that diisodecyl phthalate (21 parts) was used instead of propylene glycol diacetate (21 parts). The emulsion composition had a nonvolatile content of 55.4%, a pH of 8.2, a viscosity of 410 mPa·s, a number average molecular weight of 79,000, and a molecular weight distribution of 2.9. The polymer obtained in the first step had a Tg of 34° C., the polymer obtained in the second step had a Tg of −12° C., and the total Tg of these polymers of the first and second steps was 10° C.

EXAMPLE 28

Emulsion composition 28 for vibration damping materials was prepared in the same manner as in Example 22, except that diisodecyl phthalate (21 parts) was used instead of dipropylene glycol methyl ether acetate (21 parts). The emulsion composition had a nonvolatile content of 55.4%, a pH of 8.0, a viscosity of 400 mPa·s, a number average molecular weight of 43,000, and a molecular weight distribution of 3.2. The polymer obtained in the first step had a Tg of 18° C., the polymer obtained in the second step had a Tg of 3° C., and the total Tg of these polymers of the first and second steps was 10° C.

EXAMPLE 29

Emulsion composition 29 for vibration damping materials was prepared in the same manner as in Example 22, except that dioctyl phthalate (21 parts) was used instead of dipropylene glycol methyl ether acetate (21 parts). The emulsion composition had a nonvolatile content of 55.4%, a pH of 8.0, a viscosity of 400 mPa·s, a number average molecular weight of 44,000, and a molecular weight distribution of 3.1. The polymer obtained in the first step had a Tg of 18° C., the polymer obtained in the second step had a Tg of 3° C., and the total Tg of these polymers of the first and second steps was 10° C.

EXAMPLE 30

Emulsion composition 30 for vibration damping materials was prepared in the same manner as in Example 22, except that diisononyl phthalate (21 parts) was used instead of dipropylene glycol methyl ether acetate (21 parts). The emulsion composition had a nonvolatile content of 55.4%, a pH of 8.0, a viscosity of 400 mPa·s, a number average molecular weight of 42,000, and a molecular weight distribution of 3.3. The polymer obtained in the first step had a Tg of 18° C., the polymer obtained in the second step had a Tg of 3° C., and the total Tg of these polymers of the first and second steps was 10° C.

EXAMPLE 31

Emulsion composition 31 for vibration damping materials was prepared in the same manner as in Example 22, except that dioctyl adipate (21 parts) was used instead of dipropylene glycol methyl ether acetate (21 parts). The emulsion composition had a nonvolatile content of 55.4%, a pH of 8.0, a viscosity of 1700 mPa·s, a number average molecular weight of 45,000, and a molecular weight distribution of 3.2. The polymer obtained in the first step had a Tg of 18° C., the polymer obtained in the second step had a Tg of 3° C., and the total Tg of these polymers of the first and second steps was 10° C.

EXAMPLE 32

Emulsion composition 32 for vibration damping materials was prepared in the same manner as in Example 22, except that dioctyl phthalate (10 parts) and dipropylene glycol monobutyl ether (10 parts) were used instead of dipropylene glycol methyl ether acetate (21 parts). The emulsion composition had a nonvolatile content of 55.1%, a pH of 8.0, a viscosity of 400 mPa·s, a number average molecular weight of 43,000, and a molecular weight distribution of 3.2. The polymer obtained in the first step had a Tg of 18° C., the polymer obtained in the second step had a Tg of 3° C., and the total Tg of these polymers of the first and second steps was 10° C.

EXAMPLE 33

Emulsion composition 33 for vibration damping materials was prepared in the same manner as in Example 22, except that diisononyl phthalate (10 parts) and dipropylene glycol monopropyl ether (10 parts) were used instead of dipropylene glycol methyl ether acetate (21 parts). The emulsion composition had a nonvolatile content of 55.1%, a pH of 8.0, a viscosity of 400 mPa·s, a number average molecular weight of 46,000, and a molecular weight distribution of 3.1. The polymer obtained in the first, step had a Tg of 18° C., the polymer obtained in the second step had a Tg of 3° C., and the total Tg of these polymers of the first and second steps was 10° C.

COMPARATIVE EXAMPLE 21

Comparative emulsion composition 21 for vibration damping materials was prepared in the same manner as in Example 22, except that dimethyl fumarate (21 parts) was used instead of dipropylene glycol methyl ether acetate (21 parts). The emulsion composition had a nonvolatile content of 55.3%, a pH of 8.1, a viscosity of 680 mPa·s, a number average molecular weight of 45,000, and a molecular weight distribution of 3.1. The polymer obtained in the first step had a Tg of 18° C., the polymer obtained in the second step had a Tg of 3° C., and the total Tg of these polymers of the first and second steps was 10° C.

EXAMPLE 34

Emulsion composition 34 for vibration damping materials was prepared in the same manner as in Example 22, except that diisononyl adipate (21 parts) was used instead of dipropylene glycol methyl ether acetate (21 parts). The emulsion composition had a nonvolatile content of 55.4%, a pH of 8.1, a viscosity of 770 mPa·s, a number average molecular weight of 43,000, and a molecular weight distribution of 3.2. The polymer obtained in the first step had a Tg of 18° C., the polymer obtained in the second step had a Tg of 3° C., and the total Tg of these polymers of the first and second steps was 10° C.

EXAMPLE 35

Emulsion composition 35 for vibration damping materials was prepared in the same manner as in Example 22, except that the monomer emulsion of the first step was composed of methyl methacrylate (190 parts), 2-ethylhexyl acrylate (100 parts), styrene (200 parts), acrylic acid (10 parts), t-dodecyl mercaptan (1.0 part), a previously adjusted 20% aqueous solution of LATEMUL 118B (trade name, produced by Kao Corp.) (75 parts) and deionized water (100 parts), that the monomer emulsion of the second step was composed of methyl methacrylate (150 parts), 2-ethylhexyl acrylate (85 parts), styrene (155 parts), butyl acrylate (100 parts), acrylic acid (10 parts), t-dodecyl mercaptan (1.0 part), a previously adjusted 20% aqueous solution of LATEMUL 118B (trade name, produced by Kao Corp.) (75 parts) and deionized water (100 parts), and that diisononyl phthalate (130 parts) was used instead of dipropylene glycol methyl ether acetate (21 parts). The emulsion composition had a nonvolatile content of 57.6%, a pH of 7.9, a viscosity of 1420 mPa·s, a number average molecular weight of 44,000, and a molecular weight distribution of 3.2. The polymer obtained in the first step had a Tg of 48° C., the polymer obtained in the second step had a Tg of 18° C., and the total Tg of these polymers of the first and second steps was 32° C.

COMPARATIVE EXAMPLE 22

Comparative emulsion composition 22 for vibration damping materials was prepared in the same manner as in Example 35, except that diisononyl phthalate was not used. The emulsion composition had a nonvolatile content of 54.7%, a pH of 8.1, a viscosity of 390 mPa·s, a number average molecular weight of 44,000, and a molecular weight distribution of 3.2. The polymer obtained in the first step had a Tg of 48° C., the polymer obtained in the second step had a Tg of 18° C., and the total Tg of these polymers of the first and second steps was 32° C.

The details of the commercial products used in the above examples and comparative examples are shown below. The isothiazolinone-based compounds have no influence on the vibration damping property and peel strength of the emulsion compositions for vibration damping materials.

<Isothiazolinone-Based Compound>
FINECIDE HS-10: produced by Tokyo Fine Chemical CO., LTD, active component: 5%, 2-methyl-4-isothiazolin-3-one (MIT)
ROCIMA 553: produced by Dow Chemical Co., active component: 12%, 2-octyl-4-isothiazolin-3-one (OIT) and 2-methyl-4-isothiazolin-3-one (MIT)
PROXEL GXL: produced by Lonza, active component: 20%, 1,2-benzisothiazolin-3-one (BIT)
PROXEL NBZ: produced by Lonza, isothiazolinone active component: 5%, 1,2-benzisothiazolin-3-one (BIT) and zinc pyrithione (ZPT)
Topside 1000: produced by Permachem Asia, Ltd., active component: 5%, 5-chloro-2-methyl-4-isothiazolin-3-one (C-MIT) and 2-methyl-4-isothiazolin-3-one (MIT)

<Emulsifier>
HITENOL 18E: produced by Dai-ichi Kogyo Seiyaku Co., Ltd., ammonium polyoxyethylene alkyl ether sulfate (anionic emulsifier)
LATEMUL 118B: produced by Kao Corp., sodium polyoxyethylene alkyl ether sulfate (anionic emulsifier)
LATEMUL WX: produced by Kao Corp., ammonium polyoxyethylene polycyclic phenyl ether sulfate (anionic emulsifier)
Newcol 707SF: produced by Nippon Nyukazai Co., Ltd., sodium polyoxyethylene oleyl ether sulfate (anionic emulsifier)
EMAL O: produced by Kao Corp., sodium lauryl sulfate (anionic emulsifier)
EMULGEN 1118S: produced by Kao Corp., polyoxyethylene alkyl ether (nonionic emulsifier)
HITENOL NF-08: produced by Dai-ichi Kogyo Seiyaku Co., Ltd., ammonium polyoxyethylene styryl phenyl ether sulfate (anionic emulsifier)

The vibration damping modifiers used in the above examples and comparative examples are shown in Table 1. The classes (A-1) and (A-2) in Table 1 correspond to the classes (A-1) and (A-2) of vibration damping modifiers specified herein. The vibration damping modifiers that belong to neither (A-1) nor (A-2) are categorized into other classes.

TABLE 1

| Class of vibration damping agent | Compound | Boiling point (° C.) | Solubility (g/water 100 g) |
|---|---|---|---|
| (A-1) | Propylene glycol diacetate | 190 | 8 |
| | Dipropylene glycol monopropyl ether | 212 | 19 |
| | Dipropylene glycol monobutyl ether | 229 | 5 |
| | Dipropylene glycol methyl ether acetate | 213 | 19 |
| Other class | Diethylene glycol monoethyl ether | 202 | ∞ |
| | Ethylene glycol monobutyl ether acetate | 188 | 1 |
| | Ethylene glycol mono-n-butyl ether | 171 | 100 |

TABLE 1-continued

| Class of vibration damping agent | Compound | Boiling point (° C.) | Solubility (g/water 100 g) |
|---|---|---|---|
| (A-2) | Diisodecyl phthalate | 420 | — |
| | Diisononyl phthalate | 402 | — |
| | Dioctyl phthalate | 384 | — |
| | Dioctyl adipate | 335 | — |
| | Diisononyl adipate | 406 | — |
| Other class | Dimethyl fumarate | 192 | — |

<Preparation of Thick-Film Coating Composition for Heat-Drying (Vibration Damping Coating Composition)>

The emulsion compositions for vibration damping materials obtained in Examples 1 to 18 and Comparative Examples 1 to 9 and 14 to 17 were individually mixed with the materials shown below to prepare thick-film coating compositions for heat-drying (vibration damping coating compositions).

Emulsion composition for vibration damping materials: 359 parts
Calcium carbonate (NN #200[*1]): 620 parts
Carbon black: 1 part
Starch: 46.8 parts
Dispersant (AQUARICK DL-40S[*2]): 6 parts
Thickener (ACRYSET WR-650[*3]): 4 parts
Defoaming agent (NOPCO 8034L[*4]): 1 part
Foaming agent (F-30[*5]): 6 parts 1: Filler produced by NITTO FUNKA KOGYO K. K.
2: Polycarboxylic acid-based dispersant (active component: 44%) produced by Nippon Shokubai Co., Ltd.
3: Alkali-soluble acrylic thickener (active component: 30%) produced by Nippon Shokubai Co., Ltd.
4: Defoaming agent (mainly made of hydrophobic silicone+mineral oil) produced by SAN NOPCO Ltd.
5: Forming agent produced by Matsumoto Yushi-Seiyaku Co., Ltd.

Vibration damping property, coating viscosity, and coating thixotropy of the thick-film coating compositions for heat-drying were measured or calculated by the following methods. The results are shown in Tables 2 to 4.

<Vibration Damping Property Test>

A thick-film coating composition for heat-drying was applied onto a cold rolled steel plate (SPCC, 15 mm in width×250 mm in length×1.5 mm in thickness) to a thickness of 3 mm, and dried at 150° C. for 30 minutes. Thus, a vibration damping coating with a surface density of 4.0 Kg/m² was formed on the cold rolled steel plate. vibration damping property of the coating was determined as follows: loss coefficients at particular temperatures (20° C., 40° C., and 60° C.) were determined by a resonance method (3 dB method) using a cantilever method (loss coefficient measurement system produced by ONO SOKKI CO., LTD.). The vibration damping property were evaluated based on the total loss coefficient (the sum of loss coefficients at 20° C., 40° C., and 60° C.). A larger total loss coefficient corresponds to better vibration damping property.

<Coating Viscosity>

A thick-film coating composition for heat-drying was adjusted to 23° C., and measured for viscosity using a BH-type viscometer (produced by Tokimec Inc.) under the conditions of 2 min$^{-1}$ (=2 rpm) and 20 min$^{-1}$ (=20 rpm).

<Coating Thixotropy>

The thixotropy was calculated by the following formula.

Thixotropy=viscosity under the condition of 2 min$^{-1}$/viscosity under the condition of 20 min$^{-1}$

TABLE 2

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Weight average molecular weight | 48,000 | 51,000 | 40,000 | 38,000 | 71,000 | 240,000 | 82,000 | 240,000 | 240,000 |
| Tg (° C.) | 9.5 | 10.2 | 3.4 | 10.2 | 9.5 | 9.5 | 9.5 | 9.5 | 9.5 |
| Particle size (nm) | 222 | 203 | 169 | 248 | 103 | 95 | 105 | 111 | 110 |
| Nonvolatile content (%) | 54.9 | 55.0 | 54.6 | 55 | 54.0 | 54.6 | 56.5 | 55.1 | 55.0 |
| pH | 8.2 | 8.1 | 8.0 | 8.0 | 8.3 | 7.8 | 8.3 | 8.0 | 7.7 |
| Viscosity (mPa · s) | 410 | 500 | 290 | 240 | 320 | 350 | 1200 | 400 | 350 |
| Loss coefficient (20° C.) | 0.024 | 0.039 | 0.074 | 0.063 | 0.020 | 0.018 | 0.015 | 0.018 | 0.019 |
| Loss coefficient (40° C.) | 0.131 | 0.160 | 0.170 | 0.167 | 0.098 | 0.075 | 0.082 | 0.065 | 0.065 |
| Loss coefficient (60° C.) | 0.060 | 0.068 | 0.080 | 0.058 | 0.043 | 0.031 | 0.039 | 0.035 | 0.032 |
| Total loss coefficient | 0.215 | 0.267 | 0.324 | 0.288 | 0.161 | 0.124 | 0.136 | 0.118 | 0.116 |
| Coating viscosity (Pa · s)(2 min$^{-1}$) | 360 | 500 | 380 | 520 | 950 | 920 | 1020 | 1000 | 980 |
| Coating viscosity (Pa · s)(20 min$^{-1}$) | 60 | 120 | 70 | 105 | 250 | 240 | 300 | 270 | 260 |
| Coating thixotropy | 6.0 | 4.2 | 5.4 | 5.0 | 3.8 | 3.8 | 3.4 | 3.7 | 3.8 |

TABLE 3

|  | Example 1 | Example 2 | Example 3 | Example 4 | Example 5 | Example 6 |
|---|---|---|---|---|---|---|
| Weight average molecular weight | 50,000 | 42,000 | 51,000 | 40,000 | 50,000 | 39,000 |
| Tg (° C.) | 9.5 | 3.4 | 9.5 | 3.4 | 9.5 | 3.4 |
| Particle size (nm) | 235 | 211 | 231 | 171 | 222 | 170 |
| Nonvolatile content (%) | 54.8 | 54.5 | 55.4 | 54.9 | 54.6 | 54.6 |
| pH | 8.2 | 8.1 | 8.2 | 8.0 | 8.1 | 8.0 |
| Viscosity (mPa · s) | 410 | 500 | 410 | 290 | 360 | 280 |
| Loss coefficient (20° C.) | 0.042 | 0.084 | 0.036 | 0.096 | 0.031 | 0.081 |
| Loss coefficient (40° C.) | 0.155 | 0.198 | 0.135 | 0.202 | 0.134 | 0.194 |
| Loss coefficient (60° C.) | 0.067 | 0.092 | 0.061 | 0.084 | 0.062 | 0.089 |
| Total loss coefficient | 0.264 | 0.374 | 0.232 | 0.382 | 0.227 | 0.364 |
| Coating viscosity (Pa · s)(2 min$^{-1}$) | 310 | 370 | 350 | 350 | 290 | 370 |
| Coating viscosity (Pa · s)(20 min$^{-1}$) | 50 | 60 | 60 | 55 | 50 | 60 |
| Coating thixotropy | 6.2 | 6.2 | 5.8 | 6.4 | 5.8 | 6.2 |

|  | Example 7 | Example 8 | Example 9 | Example 10 | Example 11 | Comparative Example 14 |
|---|---|---|---|---|---|---|
| Weight average molecular weight | 39,000 | 40,000 | 40,000 | 43,000 | 40,000 | 42,000 |
| Tg (° C.) | 3.4 | 3.4 | 3.4 | 3.4 | 3.4 | 3.4 |
| Particle size (nm) | 169 | 171 | 173 | 168 | 170 | 169 |
| Nonvolatile content (%) | 54.3 | 54.5 | 54.5 | 54.6 | 54.5 | 54.5 |
| pH | 8.0 | 8.0 | 8.0 | 8.0 | 8.0 | 8.0 |
| Viscosity (mPa · s) | 280 | 280 | 280 | 230 | 290 | 280 |
| Loss coefficient (20° C.) | 0.080 | 0.084 | 0.080 | 0.094 | 0.076 | 0.075 |
| Loss coefficient (40° C.) | 0.189 | 0.198 | 0.174 | 0.192 | 0.180 | 0.171 |
| Loss coefficient (60° C.) | 0.086 | 0.092 | 0.082 | 0.086 | 0.083 | 0.080 |
| Total loss coefficient | 0.355 | 0.374 | 0.336 | 0.372 | 0.339 | 0.326 |
| Coating viscosity (Pa · s)(2 min$^{-1}$) | 370 | 370 | 340 | 350 | 380 | 360 |
| Coating viscosity (Pa · s)(20 min$^{-1}$) | 60 | 60 | 60 | 55 | 65 | 55 |
| Coating thixotropy | 6.2 | 6.2 | 5.7 | 6.4 | 5.8 | 6.5 |

TABLE 4

|  | Comparative Example 15 | Comparative Example 16 | Example 12 | Example 13 | Example 14 |
|---|---|---|---|---|---|
| Weight average molecular weight | 41,000 | 41,000 | 48,000 | 40,000 | 41,000 |
| Tg (° C.) | 3.4 | 3.4 | 9.5 | 3.4 | 3.4 |
| Particle size (nm) | 169 | 171 | 224 | 171 | 173 |
| Nonvolatile content (%) | 54.4 | 54.4 | 55.4 | 55.1 | 55.1 |
| pH | 8.1 | 8.0 | 8.1 | 8.0 | 8.0 |
| Viscosity (mPa · s) | 290 | 290 | 430 | 290 | 290 |
| Loss coefficient (20° C.) | 0.076 | 0.077 | 0.036 | 0.082 | 0.084 |
| Loss coefficient (40° C.) | 0.173 | 0.170 | 0.135 | 0.175 | 0.177 |
| Loss coefficient (60° C.) | 0.079 | 0.079 | 0.061 | 0.081 | 0.081 |
| Total loss coefficient | 0.328 | 0.326 | 0.232 | 0.338 | 0.342 |
| Coating viscosity (Pa · s)(2 min$^{-1}$) | 380 | 360 | 350 | 370 | 370 |
| Coating viscosity (Pa · s)(20 min$^{-1}$) | 57 | 60 | 60 | 60 | 60 |
| Coating thixotropy | 6.7 | 6.0 | 5.8 | 6.2 | 6.2 |

|  | Example 15 | Example 16 | Comparative Example 17 | Example 17 | Example 18 |
|---|---|---|---|---|---|
| Weight average molecular weight | 41,000 | 42,000 | 42,000 | 42,000 | 41,000 |
| Tg (° C.) | 3.4 | 3.4 | 3.4 | 3.4 | 3.4 |
| Particle size (nm) | 168 | 172 | 171 | 170 | 175 |
| Nonvolatile content (%) | 55.1 | 55.0 | 55.1 | 55.1 | 57.6 |
| pH | 8.0 | 8.0 | 8.0 | 8.1 | 8.0 |
| Viscosity (mPa · s) | 2760 | 290 | 590 | 640 | 560 |
| Loss coefficient (20° C.) | 0.080 | 0.096 | 0.075 | 0.083 | 0.088 |
| Loss coefficient (40° C.) | 0.172 | 0.202 | 0.171 | 0.173 | 0.184 |
| Loss coefficient (60° C.) | 0.081 | 0.084 | 0.080 | 0.081 | 0.086 |
| Total loss coefficient | 0.333 | 0.382 | 0.326 | 0.337 | 0.358 |
| Coating viscosity (Pa · s)(2 min$^{-1}$) | 2140 | 340 | 540 | 510 | 840 |
| Coating viscosity (Pa · s)(20 min$^{-1}$) | 680 | 55 | 89 | 82 | 97 |
| Coating thixotropy | 3.1 | 6.2 | 6.1 | 6.2 | 8.7 |

Vibration damping coating compositions were prepared in the same manner as described above using the vibration damping emulsion compositions prepared in Examples 1 to 3 and 19 to 35 and Comparative Examples 1 to 4, 10 to 13, and 18 to 22, and evaluated for vibration damping property and measured for peel strength of coatings as described below. The results are shown in Tables 5 to 7. The average particle sizes, nonvolatile contents, pH values, and viscosities of the vibration damping emulsion compositions are also shown in Tables 5 to 7.

<Vibration Damping Property Test>

A vibration damping coating composition prepared above was applied onto a cold rolled steel plate (SPCC, 15 mm in width×250 mm in length×1.5 mm in thickness) to a thickness of 3 mm, and dried at 150° C. for 30 minutes. Thus, a vibration damping coating with a surface density of 4.0 Kg/m$^2$ was formed on the cold rolled steel plate. The coating was determined for vibration damping property as follows: loss coefficients at particular temperatures (20° C., 40° C., and 60° C.) were determined by a resonance method (3 dB method) using a cantilever method (loss coefficient measurement system produced by ONO SOKKI CO., LTD.). A larger the total loss coefficient corresponds to better vibration damping property.

<Coating Peel Strength>

The peel strength was measured using a Building Research Institute type adhesion tester in the manner described below.

The substrate used was a 20 cm×20 cm×3 mm cold rolled steel plate (SPCC). A vibration damping coating composition prepared above was applied to a thickness of 3 mm, dried in a hot air drier at 130° C. for 30 minutes, and then cooled to room temperature. As shown in FIG. 1, an attachment 3 with an adhesion area of 4.0 cm×4.0 cm was attached to the dried vibration damping coating composition 2 on the substrate 1 with an epoxy resin adhesive 4 (CEMEDINE 1500, produced by CEMEDINE CO., LTD.). The adhesive was aged at 25° C. for 4 days to cure, and a notch 5 extending to the substrate was made by a utility knife along the circumference of the attachment 3. Then, the attachment 3 was pulled using a Building Research Institute-type adhesion tester (LPT-1500, produced by YAMAMOTO KOJUKI CO., LTD.) in the direction 6 that was perpendicular to the surface of the substrate 1 with the coating of the vibration damping coating composition 2 formed thereon to measure the load (breaking load) required to peel the coating of the vibration damping coating composition 2 from the substrate 1. The test was performed at 25° C., and the loading rate of the Building Research Institute-type adhesion tester was about 100 kPa/sec. The peel strength was calculated by the following formula from the measured breaking load and the adhesion area between the attachment 3 and the vibration damping coating composition 2 (=the area of the coating of the vibration damping coating composition 2 peeled off from the substrate 1).

Peel strength (kPa)=(breaking load (N)/adhesion area (cm$^2$))×10

TABLE 5

|  |  | Comparative Example 1 | Comparative Example 2 | Comparative Example 3 | Comparative Example 4 | Comparative Example 10 | Comparative Example 11 | Comparative Example 12 | Comparative Example 13 |
|---|---|---|---|---|---|---|---|---|---|
| Particle size (nm) | | 222 | 203 | 169 | 248 | 103 | 95 | 105 | 135 |
| Nonvolatile content (%) | | 54.9 | 55.0 | 54.6 | 55.0 | 54.7 | 54.6 | 54.5 | 54.9 |
| pH | | 8.2 | 8.1 | 8.0 | 8.0 | 7.8 | 7.8 | 8.3 | 8.0 |
| Viscosity (mPa · s) | | 410 | 500 | 290 | 240 | 150 | 350 | 350 | 440 |
| Vibration damping property (loss coefficient) | 20° C. | 0.024 | 0.039 | 0.074 | 0.063 | 0.033 | 0.018 | 0.035 | 0.028 |
| | 40° C. | 0.131 | 0.160 | 0.170 | 0.167 | 0.101 | 0.075 | 0.109 | 0.142 |
| | 60° C. | 0.060 | 0.068 | 0.080 | 0.058 | 0.035 | 0.031 | 0.037 | 0.065 |
| | Total | 0.215 | 0.267 | 0.324 | 0.288 | 0.169 | 0.124 | 0.181 | 0.235 |
| Coating peel strength (kPa) | | 745 | 725 | 1014 | 569 | 186 | 137 | 177 | 216 |

TABLE 6

|  |  | Example 1 | Example 2 | Example 3 | Example 19 | Example 20 | Example 21 | Example 22 | Example 23 | Example 24 | Example 25 | Example 26 |
|---|---|---|---|---|---|---|---|---|---|---|---|---|
| Particle size (nm) | | 235 | 211 | 231 | 232 | 101 | 98 | 128 | 134 | 123 | 129 | 126 |
| Nonvolatile content (%) | | 54.8 | 54.5 | 55.4 | 55.1 | 54.5 | 54.6 | 54.9 | 54.7 | 54.8 | 54.9 | 54.8 |
| pH | | 8.2 | 8.1 | 8.2 | 8.2 | 7.8 | 7.8 | 8.0 | 8.0 | 8.0 | 8.0 | 8.0 |
| Viscosity (mPa · s) | | 410 | 500 | 410 | 410 | 340 | 350 | 430 | 430 | 420 | 400 | 440 |
| Vibration damping property (loss coefficient) | 20° C. | 0.042 | 0.084 | 0.036 | 0.054 | 0.023 | 0.020 | 0.046 | 0.044 | 0.045 | 0.052 | 0.034 |
| | 40° C. | 0.155 | 0.198 | 0.135 | 0.161 | 0.096 | 0.092 | 0.164 | 0.160 | 0.163 | 0.166 | 0.153 |
| | 60° C. | 0.067 | 0.092 | 0.061 | 0.069 | 0.037 | 0.035 | 0.070 | 0.069 | 0.071 | 0.068 | 0.068 |
| | Total | 0.264 | 0.374 | 0.232 | 0.284 | 0.156 | 0.147 | 0.280 | 0.273 | 0.279 | 0.286 | 0.255 |
| Coating peel strength (kPa) | | 874 | 1138 | 818 | 941 | 276 | 238 | 332 | 291 | 328 | 342 | 258 |

TABLE 7

|  | Comparative Example 18 | Comparative Example 19 | Comparative Example 20 | Example 27 | Example 28 | Example 29 | Example 30 |
|---|---|---|---|---|---|---|---|
| Particle size (nm) | 131 | 132 | 127 | 97 | 135 | 128 | 130 |
| Nonvolatile content (%) | 54.3 | 54.7 | 54.6 | 55.4 | 55.4 | 55.4 | 55.4 |
| pH | 8.0 | 8.1 | 8.0 | 8.2 | 8.0 | 8.0 | 8.0 |
| Viscosity (mPa·s) | 390 | 420 | 400 | 410 | 400 | 400 | 400 |
| Vibration damping property (loss coefficient) 20° C. | 0.03 | 0.032 | 0.032 | 0.030 | 0.044 | 0.038 | 0.043 |
| 40° C. | 0.148 | 0.148 | 0.143 | 0.085 | 0.155 | 0.148 | 0.152 |
| 60° C. | 0.066 | 0.068 | 0.065 | 0.032 | 0.065 | 0.063 | 0.066 |
| Total | 0.244 | 0.248 | 0.240 | 0.147 | 0.264 | 0.249 | 0.261 |
| Coating peel strength (kPa) | 223 | 237 | 228 | 266 | 294 | 245 | 302 |

|  | Example 31 | Example 32 | Example 33 | Comparative Example 21 | Example 34 | Example 35 | Comparative Example 22 |
|---|---|---|---|---|---|---|---|
| Particle size (nm) | 128 | 132 | 134 | 130 | 129 | 154 | 151 |
| Nonvolatile content (%) | 55.4 | 55.1 | 55.1 | 55.3 | 55.4 | 57.6 | 54.7 |
| pH | 8.0 | 8.0 | 8.0 | 8.1 | 8.1 | 7.9 | 8.1 |
| Viscosity (mPa·s) | 1700 | 400 | 400 | 680 | 770 | 1420 | 390 |
| Vibration damping property (loss coefficient) 20° C. | 0.039 | 0.042 | 0.055 | 0.031 | 0.041 | 0.051 | 0.009 |
| 40° C. | 0.149 | 0.160 | 0.168 | 0.144 | 0.151 | 0.163 | 0.014 |
| 60° C. | 0.067 | 0.066 | 0.073 | 0.062 | 0.067 | 0.071 | 0.161 |
| Total | 0.255 | 0.268 | 0.296 | 0.237 | 0.259 | 0.285 | 0.184 |
| Coating peel strength (kPa) | 314 | 289 | 370 | 219 | 292 | 321 | 244 |

REFERENCE SIGNS LIST

1: Substrate
2: Vibration damping coating composition
3: Attachment
4: Epoxy resin adhesive
5: Notch made by a utility knife
6: Direction of pulling attachment by Building Research Institute-type adhesion tester

The invention claimed is:

1. An emulsion composition for vibration damping materials, comprising:
a vibration damping modifier including a compound that has 7 or more carbon atoms, a boiling point of 190° C. or higher, a solubility of 6 to 80 g in 100 g of water, and at least two ether groups or at least two ester groups; and
a polymer emulsion.

2. The emulsion composition for vibration damping materials according to claim 1,
wherein the vibration damping modifier further includes a compound that has 7 or more carbon atoms, a boiling point of 400° C. or higher, ester groups in the molecule, and at least two ether groups or at least two ester groups in the molecule.

3. An emulsion composition for vibration damping materials, comprising:
a vibration damping modifier including a compound that has 7 or more carbon atoms, a boiling point of 400° C. or higher, ester groups in the molecule and at least two ether groups or at least two ester groups in the molecule; and
a polymer emulsion.

4. The emulsion composition for vibration damping materials according to claim 1,
wherein the polymer emulsion includes a polymer obtained from a monomer component that includes 0.5 to 10% by mass of an unsaturated carboxylic acid monomer and 20 to 80% by mass of a monomer whose homopolymer has a glass transition temperature of 100° C. or higher, based on 100% by mass of the monomer component.

5. The emulsion composition for vibration damping materials according to claim 4,
wherein the vibration damping modifier is present in an amount of 0.1 to 50% by mass based on 100% by mass of the monomer whose homopolymer has a glass transition temperature of 100° C. or higher, the monomer being included in the monomer component which is a raw material of the polymer emulsion.

6. The emulsion composition for vibration damping materials according to claim 1,
wherein a monomer component which is a raw material of the polymer emulsion includes butyl acrylate and/or 2-ethylhexyl acrylate.

7. The emulsion composition for vibration damping materials according to claim 3,
wherein the polymer emulsion includes a polymer obtained from a monomer component that includes 0.5 to 10% by mass of an unsaturated carboxylic acid monomer and 20 to 80% by mass of a monomer whose homopolymer has a glass transition temperature of 100° C. or higher, based on 100% by mass of the monomer component.

8. The emulsion composition for vibration damping materials according to claim 7,
wherein the vibration damping modifier is present in an amount of 0.1 to 50% by mass based on 100% by mass of the monomer whose homopolymer has a glass transition temperature of 100° C. or higher, the monomer being included in the monomer component which is a raw material of the polymer emulsion.

9. The emulsion composition for vibration damping materials according to claim 3,
wherein a monomer component which is a raw material of the polymer emulsion includes butyl acrylate and/or 2-ethylhexyl acrylate.

* * * * *